(12) United States Patent
Chen et al.

(10) Patent No.: US 11,262,856 B2
(45) Date of Patent: Mar. 1, 2022

(54) INTERACTION METHOD, DEVICE AND EQUIPMENT FOR OPERABLE OBJECT

(71) Applicant: Beijing Bytedance Network Technology Co., Ltd., Beijing (CN)

(72) Inventors: Guibin Chen, Beijing (CN); Chi Fang, Beijing (CN); Wei Lu, Beijing (CN); Huayun Miao, Beijing (CN); Yonghao Luo, Beijing (CN); Yi Li, Beijing (CN); Yumeng Li, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 16/981,274

(22) PCT Filed: May 9, 2019

(86) PCT No.: PCT/CN2019/086292
§ 371 (c)(1),
(2) Date: Sep. 15, 2020

(87) PCT Pub. No.: WO2019/214696
PCT Pub. Date: Nov. 14, 2019

(65) Prior Publication Data
US 2021/0055804 A1 Feb. 25, 2021

(30) Foreign Application Priority Data

May 11, 2018 (CN) .......................... 201810451127.3
Jun. 19, 2018 (CN) .......................... 201810631374.1
(Continued)

(51) Int. Cl.
*G06F 3/0346* (2013.01)
*H04M 1/724* (2021.01)

(52) U.S. Cl.
CPC .......... *G06F 3/0346* (2013.01); *H04M 1/724* (2021.01)

(58) Field of Classification Search
CPC ........................... H04M 1/724; G06F 3/0346
(Continued)

(56) References Cited

U.S. PATENT DOCUMENTS 8,228,292 B1 * 7/2012 Ruiz ..................... G06F 1/1694
345/156
9,063,574 B1 * 6/2015 Ivanchenko ............. G06F 1/32
(Continued)

FOREIGN PATENT DOCUMENTS

| CN | 102662586 A | 9/2012 |
|---|---|---|
| CN | 103885685 A | 6/2014 |

(Continued)

OTHER PUBLICATIONS

International Patent Application No. PCT/CN2019/086292; Int'l Search Report; dated Jul. 29, 2019; 3 pages.
(Continued)

*Primary Examiner* — Albert K Wong
(74) *Attorney, Agent, or Firm* — BakerHostetler

(57) ABSTRACT

An interaction method, device and equipment for operable object. The mobile terminal acquires a moving direction and a moving displacement when moving (S101); an initial position of an operable object is an original position of the operable object before the mobile terminal moves; the mobile terminal determines, according to the moving direction, the moving displacement, and the initial positions of the operable objects, determines an application to be launched corresponding to a screen of the mobile terminal; the application to be launched is displayed on the screen of the mobile terminal (S102); and the application to be launched is launched (S103).

16 Claims, 29 Drawing Sheets

(30) Foreign Application Priority Data

| Jun. 19, 2018 | (CN) | 201810631375.6 |
| Jun. 21, 2018 | (CN) | 201810644466.3 |
| Jun. 21, 2018 | (CN) | 201810645574.2 |

(58) Field of Classification Search
USPC .................................................. 345/156
See application file for complete search history.

(56) References Cited

U.S. PATENT DOCUMENTS

| 9,465,445 | B2 | 10/2016 | Burckard |
| 10,288,446 | B2 | 5/2019 | Theytaz et al. |
| 10,692,288 | B1 | 6/2020 | Rasmussen et al. |
| 10,955,928 | B2* | 3/2021 | Burckard ................ G06F 3/044 |
| 10,956,029 | B1 | 3/2021 | O'Rourke et al. |
| 2006/0107213 | A1* | 5/2006 | Kumar .................. G06F 3/0346 715/700 |
| 2006/0177103 | A1* | 8/2006 | Hildreth ............. H04N 1/00323 382/107 |
| 2009/0217211 | A1 | 8/2009 | Hildreth et al. |
| 2009/0262074 | A1* | 10/2009 | Nasiri ................ G06F 3/04817 345/158 |
| 2009/0325647 | A1 | 12/2009 | Cho et al. |
| 2010/0001967 | A1 | 1/2010 | Yoo |
| 2010/0033428 | A1* | 2/2010 | Ahn ..................... G06F 3/0346 345/157 |
| 2010/0283729 | A1 | 11/2010 | Sung et al. |
| 2013/0076659 | A1* | 3/2013 | Miyaji .................. G06F 3/0484 345/173 |
| 2013/0120240 | A1* | 5/2013 | Hong ..................... G06F 3/017 345/156 |
| 2013/0222241 | A1* | 8/2013 | Jeong ................... G06F 3/0485 345/158 |
| 2014/0009504 | A1 | 1/2014 | Lee et al. |
| 2014/0062874 | A1* | 3/2014 | Suggs .................. G06F 3/0325 345/158 |
| 2014/0187166 | A1 | 7/2014 | Choi |
| 2014/0195953 | A1 | 7/2014 | Sakai et al. |
| 2014/0225930 | A1 | 8/2014 | Durmek |
| 2015/0143266 | A1 | 5/2015 | Strode |
| 2015/0269436 | A1 | 9/2015 | Kim et al. |
| 2016/0117076 | A1 | 4/2016 | Kim et al. |
| 2016/0132119 | A1 | 5/2016 | Temple |
| 2016/0364107 | A1 | 12/2016 | Yim et al. |
| 2016/0370872 | A1* | 12/2016 | Burckard ............ G06F 3/04883 |
| 2017/0064071 | A1 | 3/2017 | Won et al. |
| 2017/0192642 | A1 | 7/2017 | Fishman et al. |
| 2017/0195736 | A1 | 7/2017 | Chai et al. |
| 2017/0199570 | A1 | 7/2017 | Kwon et al. |
| 2017/0228748 | A1 | 8/2017 | Shibayama et al. |
| 2017/0235439 | A1 | 8/2017 | Lu et al. |
| 2017/0344329 | A1 | 11/2017 | Oh et al. |
| 2018/0027357 | A1 | 1/2018 | Kwon |
| 2018/0109729 | A1 | 4/2018 | Jang et al. |
| 2018/0335936 | A1* | 11/2018 | Missig ................ G06F 3/04817 |
| 2018/0335939 | A1* | 11/2018 | Karunamuni ........... G06F 9/445 |
| 2018/0364808 | A1 | 12/2018 | Pahud et al. |

FOREIGN PATENT DOCUMENTS

| CN | 105045483 A | 11/2015 |
| CN | 105094567 A | 11/2015 |
| CN | 105302463 A | 2/2016 |
| CN | 105975294 A | 9/2016 |
| CN | 106131434 A | 11/2016 |
| CN | 106227423 A | 12/2016 |
| CN | 106575199 A | 4/2017 |
| CN | 106603846 A | 4/2017 |
| CN | 106873873 A | 6/2017 |
| CN | 106970734 A | 7/2017 |
| CN | 107346198 A | 11/2017 |
| CN | 109743438 A | 5/2019 |
| CN | 109753146 A | 5/2019 |
| CN | 109753199 A | 5/2019 |
| CN | 109753209 A | 5/2019 |
| CN | 109753212 A | 5/2019 |

OTHER PUBLICATIONS

International Patent Application No. PCT/CN2019/087862; Int'l Search Report; dated Aug. 8, 2019; 2 pages.

International Patent Application No. PCT/CN2019/088645; Int'l Search Report; dated Sep. 2, 2019; 3 pages.

* cited by examiner though the disclosure provides an interaction device for operable object, applied to a mobile terminal which includes a plurality of operable objects, comprising:
INTERACTION METHOD, DEVICE AND EQUIPMENT FOR OPERABLE OBJECT

CROSS-REFERENCE TO RELATED APPLICATION

The disclosure is the national phase application of International Patent Application No. PCT/CN2019/086292, titled "INTERACTION METHOD, DEVICE AND EQUIPMENT FOR OPERABLE OBJECT", filed on May 9, 2019, which claims priority to Chinese Patent Application No. 201810451127.3, filed on May 11, 2018, Chinese Patent Application No. 201810645574.2, filed on Jun. 21, 2018, Chinese Patent Application No. 201810631375.6, filed on Jun. 19, 2018, Chinese Patent Application No. 201810644466.3, filed on Jun. 21, 2018, and Chinese Patent Application No. 201810631374.1, filed on Jun. 19, 2018, the entire contents of all of which are incorporated herein by reference.

TECHNICAL FIELD

The disclosure relates to the field of the electronic equipment, and in particular relates to an interaction method, device and equipment for operable object.

BACKGROUND

Techniques in the field of human-computer interaction have rapidly developed in recent years. The human-computer interaction techniques refer to the technology that realizes the dialogue between human and computers in an effective way through computer input and output devices At present, as one kind of human-computer interaction, when a mobile terminal is used by users, users frequently face the requirement of skipping from the current application (APP for short) to another application, such as skipping from an interface of a social network APP to an interface of a navigation APP to search a travel route, and the like. At this point, it is necessary for the mobile terminal to operate a new application.

SUMMARY

The disclosure provides an interaction method device and equipment for operable object, which does not require the user to perform complex manual operation to determine the operable object which can be determined by the mobile terminal through moving, so as to reduce the dependence on the user's manual touch, improve the convenience of interaction, and effectively upgrade the user experience.

In one aspect, the disclosure provides:

An interaction method for operable object, applied to a mobile terminal, comprising:

acquiring a moving direction and a moving displacement of the mobile terminal when the mobile terminal moves in the moving direction for the moving displacement; and determining, according to the moving direction, the moving displacement, and a preset initial position associated with the operable object, whether the moving direction, the moving displacement and the initial position satisfy a preset condition, and determining the operable object on the initial position as a target operable object when the preset condition is satisfied, wherein the preset initial position associated with an operable object is the original position of the operable object before the mobile terminal moves.

Yet another aspect of the disclosure provides an interaction device for operable object, applied to a mobile terminal which includes a plurality of operable objects, comprising:

an acquisition module configured to acquire a moving direction and a moving displacement of the mobile terminal when the mobile terminal moves in the moving direction for the moving displacement; and a determination module configured to determine, according to the moving direction, the moving displacement, and a preset initial position associated with an operable object, whether the moving direction, the moving displacement and the initial position satisfy a preset condition, and determining the operable object on the initial position as a target operable object when the preset condition is satisfied, wherein the initial position associated with the operable object is an original position of the operable object before the mobile terminal moves; and an operation module configured to perform a target operation on the target operable object when a second preset condition is satisfied.

Still another aspect of the disclosure provides a mobile terminal, comprising at least one memory and at least one processor, wherein the at least one memory is configured to store a program code, and the at least one processor is configured to call the program code stored in the at least one memory to implement the interaction method provided by any one of embodiments of the disclosure.

Still another aspect of the disclosure provides a storage medium, wherein the storage medium is configured to store a program code, and the program code is configured to implement the interaction method provided by any one of embodiments of the disclosure.

Yet another aspect of the disclosure provides a computer program product including instructions executable by computer to cause the computer to implement the interaction method provided by any one of embodiments of the disclosure.

The disclosure has at least the following advantages:

According to the interaction method for operable object provided by the disclosure, a mobile terminal acquires a moving direction and moving displacement of the mobile terminal when the mobile terminal moves in the moving direction for the moving displacement; whether the moving direction, the moving displacement and a preset initial position associated with an operable object satisfy a preset condition is determined according to the moving direction, the moving displacement, and the preset initial position associated with the operable object, and then the operable object on the initial position is determined as a target operable object when the preset condition is satisfied, wherein the preset initial position associated with the operable object is the original position of the operable object before the mobile terminal moves. It can be seen that the interaction method for operable object in mobile terminal provided by the disclosure does not require the user to perform complex manual operation to determine the operable object which can be determined by the mobile terminal through moving, so as to reduce the dependence on the user's manual touch, improve the convenience of interaction, and effectively upgrade the user experience.

BRIEF DESCRIPTION OF THE DRAWINGS

In order to more clearly explain the technical solutions in the embodiments of the disclosure, the drawings required in the description of the embodiments will be briefly introduced below. Obviously, the drawings in the following description are only some embodiments of the disclosure. For those of ordinary skill in the art, without paying any creative labor, other drawings can also be acquired based on these drawings.

DETAILED DESCRIPTION OF THE DISCLOSURE

Figure 1:
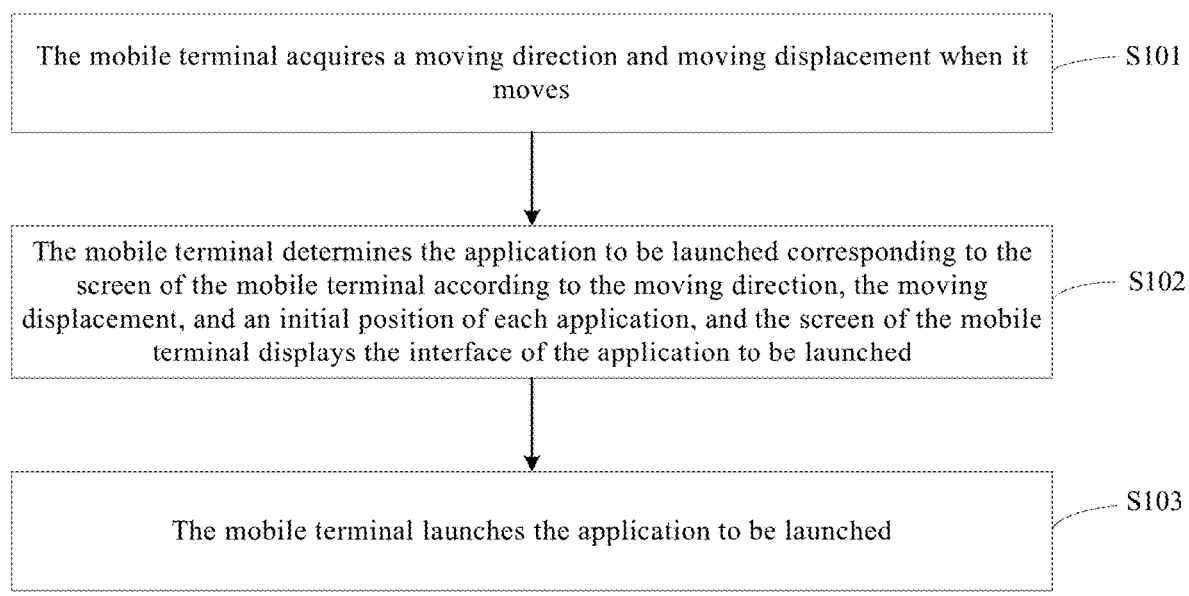
FIG. 1 is a flow chart of the method for launching the application of the mobile terminal according to an embodiment of the disclosure.

The relative interaction method for operable object of a mobile terminal requires the user to perform a corresponding manual touch operation on the screen or button of the mobile terminal. However, the method has a strong dependence on the user's manual touch operation. When the screen of the mobile terminal is large or the button position is inconvenient to touch, etc., it is difficult for the user to trigger the application operation through finger movements, thereby causing a decrease in user experience. Therefore, there is an urgent need to provide a new interacting method for various operable objects of the mobile terminal to reduce the user's dependence on manual touch operations. In the disclosure, the interaction method includes a determination method and/or an operation method of the operable object. In the disclosure, the operable object may be any object that is able to be operated, such as an application program, a page, a file, or a multimedia file, and the operation on the operable object, such as an application, may be launching an application, switching an application, transferring files between applications, or transferring files to an application. It should be noted that in the operations of the application in the disclosure, the operation process such as transferring files between applications or transferring files to the application includes method steps of launching the application or switching the application. Therefore, the method of launching an application which will be described in detail below is also applicable to the method of transferring files.

The embodiments of the disclosure provide an interaction method, device and equipment for operable object. First, the mobile terminal acquires a moving direction and a moving displacement of the mobile terminal when the mobile terminal moves in the moving direction for the moving displacement; second, whether the movement direction, moving displacement, and a preset initial position satisfy a preset condition is determined according to the moving direction, moving displacement, and the initial position associated with the operable object; and when the preset condition is satisfied, the operable object at the initial position is determined as a target operable object; wherein the preset initial position associated with the operable object is the original position of the operable object before the mobile terminal moves.

In some embodiments of the disclosure, a mobile terminal acquires the moving direction and moving displacement of the mobile terminal when the mobile terminal moves in the moving direction for the moving displacement, and determines, according to the moving direction, moving displacement, and a preset initial position associated with an application, whether the moving direction, moving displacement, and the preset initial position associated with the application satisfy a preset condition wherein the initial position associated with the application is the original position of the application before the mobile terminal moves, the application at the initial position is determined as a target application in response to determining that the preset condition is satisfied, and the target is launched when a second preset condition is satisfied.

In some embodiments of the disclosure, a mobile terminal presets an initial position for an application, wherein the initial position associated with the application is located outside a screen display of the mobile terminal; then a target application can be determined from the applications according to a current position of the mobile terminal; and then when a movement of the mobile terminal is detected, a distance between the mobile terminal and the target application is shortened according to the movement, then a first distance between the current position of the mobile terminal and the preset initial position associated with the target application is determined, and furthermore, the target application can be launched when the first distance is less than a predetermined threshold.

In some embodiments of the disclosure, a mobile terminal acquires a moving direction and a moving displacement of the mobile terminal when the mobile terminal moves in the moving direction for the moving displacement, and then the mobile terminal determines, according to the moving direction, moving displacement, and a preset initial position associated with an application, the application to be launched corresponding to the screen after the movement, wherein the preset initial position associated with the application is located outside a screen display of the mobile terminal; and then an interface of the application to be launched is displayed on the screen display of the mobile terminal; further, the mobile terminal launches the application to be launched.

In some embodiments of the disclosure, when user intends to share a file, the user determines a target file in a current application through the mobile terminal, and a moving direction and a moving displacement of the mobile terminal are acquired when the user moves the mobile terminal, and then a target application currently corresponding to a screen of the mobile terminal is determined according to a preset condition involving the moving direction, the moving displacement, and a preset initial position associated with an application. When a second preset condition is satisfied, the determined target file is transmitted to the target application to realize the file output.

It can be seen that in the method for launching an application of the mobile terminal provided by the embodiments of the disclosure, the mobile terminal can acquire the moving direction and displacement by moving and thus determine and launch the application to be launched without the user performing complex manual operation to trigger the application startup. Therefore, the dependence of the application startup on the manual touch operation of the user is reduced, the convenience of the application startup is improved, and the user experience is upgraded.

In order to enable those skilled in the art to better understand the solutions of the disclosure, the technical solutions in the embodiments of the present disclosure will be described clearly and completely in conjunction with the drawings in the embodiments of the present disclosure. Obviously, the described embodiments are only a part of the embodiments of the present disclosure, but not all the embodiments. Based on the embodiments in the disclosure, all other embodiments acquired by a person of ordinary skill in the art without creative work fall within the protection scope of the present disclosure.

As used in the specification and claims, the term "operable object" refers to an object displayed on the mobile terminal and capable of being operated by a user, including but not limited to an application program, a page of an application program, or a file. In some embodiments provided by the disclosure, an operable object is determined as a target operable object in response to the operable object satisfying a condition described in these embodiments. The term "target operable object" refers to an operable object on which a target operation is intended to be performed.

The term "target operation" on an operable object refers to an operation that causes the operable object to perform its function. For example, the target operation on an application includes launching the application, displaying a page of the application, or transferring files to the application.

The term "initial position" or "preset initial position" associated with an operable object refers to the original position associated with the application before the mobile terminal moves. In some embodiments provided by the disclosure, a preset initial position associated with an operable object is located outside a screen display of the mobile terminal.

The term "first distance" refers to a distance between a current position of the mobile terminal and a preset initial position associated with an operable object. The current position of the mobile terminal can be identified by coordinates.

Method Embodiment:

One embodiment of the present disclosure provides a method for a mobile terminal to launch an application, including the following steps:

Step 1: The mobile terminal acquires its own moving direction and moving displacement when the mobile terminal moves in the moving direction for the moving displacement.

It should be noted that in this embodiment, the mobile terminal can be any mobile or portable electronic device, including but not limited to smart phones, mobile computers, tablets, personal digital assistants (PDA), media players, etc. When users need to use another application other than the current application in the mobile terminal, they can hold and move the mobile terminal.

In this embodiment, before the mobile terminal moves, a position of an application has been set and fixed in advance. The mobile terminal saves an interface of the application in advance. It should be noted that the interface of the above application refers to a pre-saved picture, not the actual interface after the application is actually launched. The interfaces of applications are different from each other. The content displayed on the interface may be a screen corresponding to the initial startup of the application or an interface corresponding to a certain running state after the application is launched.

Taking FIG. 2 as an example, the preset relative position relationship of applications will be described in detail below.

Figure 2:
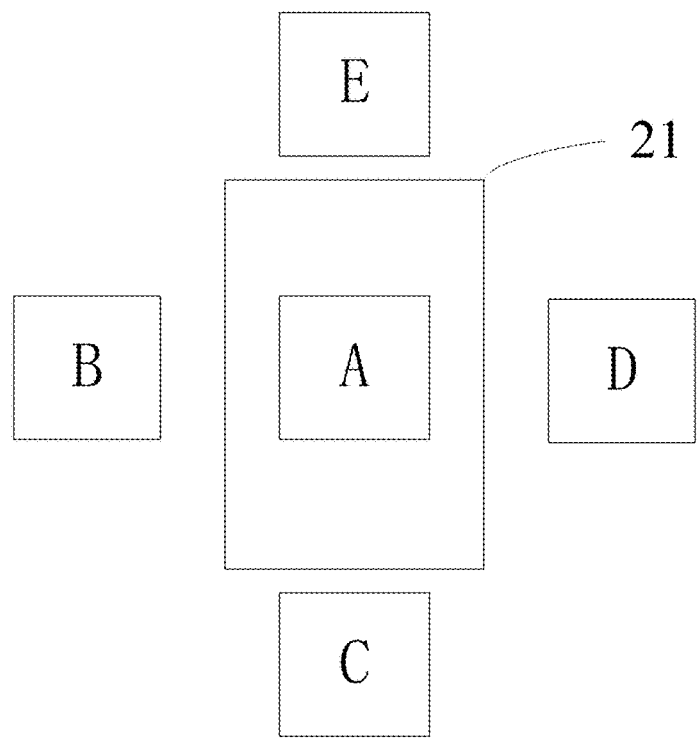
FIG. 2 is a schematic diagram illustrating relative position of applications before the mobile terminal is moved according to an embodiment of the disclosure.

FIG. 2 is a schematic diagram of the relative positions of various applications before the mobile terminal moves. An application A corresponding to the screen 21 of the mobile terminal is set on a surface, and application B, application C, application D, and application E are set on the left, right, bottom, right, and top of application A. It can be understood that, when the mobile terminal moves, the application for the screen of the mobile terminal 21 will change according to the specific moving direction and displacement of the mobile terminal, that is, the position of the operable object changes relative to the mobile terminal according to the moving direction and displacement of the mobile terminal. For specific description, please refer to FIGS. 3 to 6 below.

Figure 3:
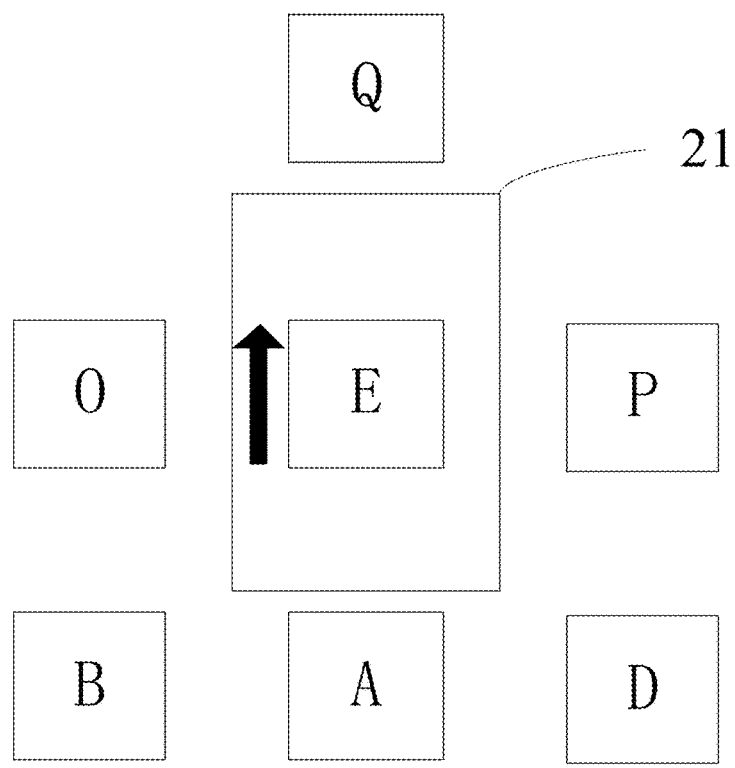
FIG. 3 is a schematic diagram of a mobile terminal moving upward according to an embodiment of the disclosure.

FIG. 3 is a schematic diagram of a mobile terminal moving up according to an embodiment of the disclosure. Based on the relative position of the applications before the mobile terminal shown in FIG. 2 moves, when the mobile terminal moves upward by a preset displacement, it can be seen from FIG. 3 that the application E is corresponding to the screen of the mobile terminal 21, and application O, application A, application P, and application Q are arranged respectively to the left, bottom, right, and top of the screen 21 of the mobile terminal, and application B and D are arranged to the left and right of application A.

Figure 4:
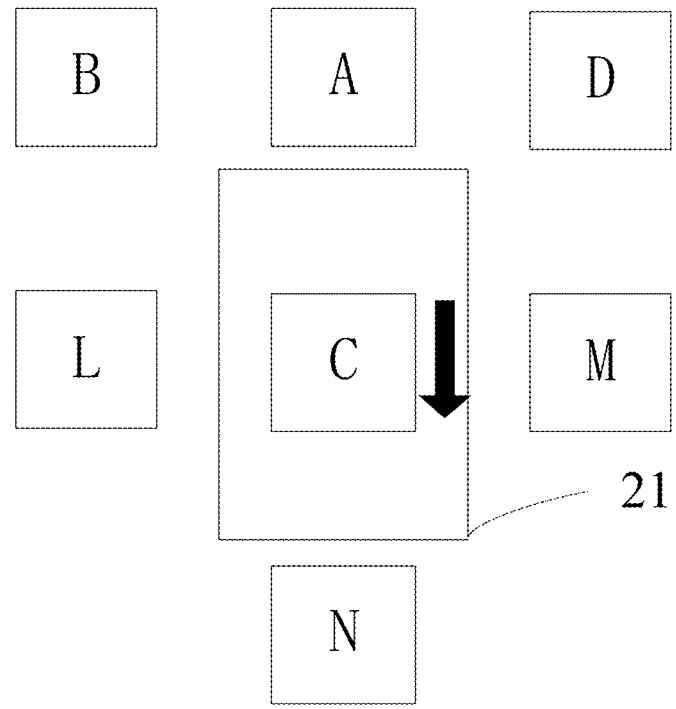
FIG. 4 is a schematic diagram of a mobile terminal moving downward according to an embodiment of the disclosure.

FIG. 4 is a schematic diagram of a mobile terminal moving downward according to an embodiment of the disclosure. Based on the relative position of applications before the mobile terminal shown in FIG. 2 moves, when the mobile terminal moves downward by a preset displacement, it can be seen from FIG. 4 that the application C is corresponding to screen of the mobile terminal 21, and application L, application N, application M, and application A are arranged respectively to the left, bottom, right, and top of the screen 21 of the mobile terminal, and application B and D are arranged respectively to the left and right of application A.

Figure 5:
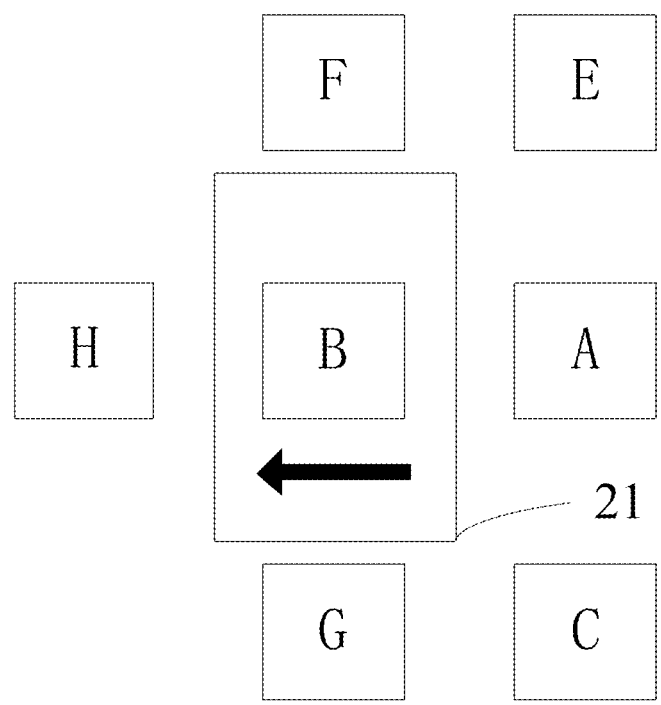
FIG. 5 is a schematic diagram of a mobile terminal moving leftward according to an embodiment of the disclosure.

FIG. 5 is a schematic diagram of a mobile terminal moving leftward according to an embodiment of the disclosure. Based on the relative position of applications before the mobile terminal shown in FIG. 2 moves, when the mobile terminal moves leftward by a preset displacement, it can be seen from FIG. 5 that the application B is corresponding to screen of the mobile terminal 21, and application H, application G, application A, and application F are arranged respectively to the left, bottom, right, and top of the screen 21 of the mobile terminal, and application E and C are arranged respectively to the top and bottom of application A.

Figure 6:
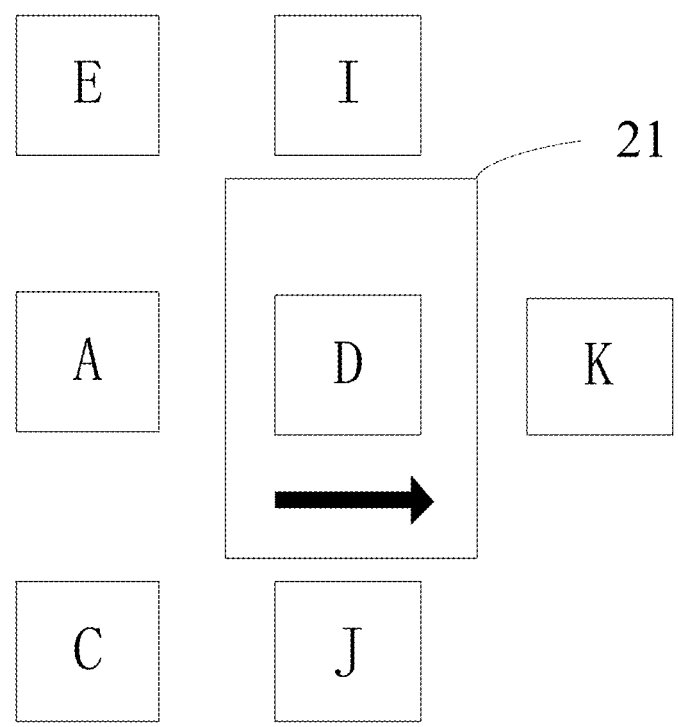
FIG. 6 is a schematic diagram of a mobile terminal moving rightward according to an embodiment of the disclosure.

FIG. 6 is a schematic diagram of a mobile terminal moving rightward according to an embodiment of the disclosure. Based on the relative position of applications before the mobile terminal shown in FIG. 2 moves, when the mobile terminal moves rightward by a preset displacement, it can be seen from FIG. 6 that the application B is corresponding to screen of the mobile terminal 21, and application A, application J, application K, and application I are arranged respectively to the left, bottom, right, and top of the screen 21 of the mobile terminal, and application E and C are arranged to the top and bottom of application A.

In this embodiment, the mobile terminal can launch the application displayed on the screen after being moved as the application to be launched. Therefore, in order to determine the application to be launched, the mobile terminal needs to acquire the moving direction and displacement when it moves.

In this embodiment, the mobile terminal may acquire the moving direction through the acceleration sensor provided by itself, or may acquire the moving direction through the gyro sensor provided by itself. According to FIGS. 3 to 6 and the description above, when the applications are arranged on the same surface, the moving directions of the mobile terminal may be: moving upward, moving downward, moving left, and moving right. When the applications are arranged on different surfaces parallel to each other, in addition to the above four movement modes (see FIGS. 7 and 8), the moving direction of the mobile terminal may also be moving forward and moving backward (see FIG. 9).

Figure 7:
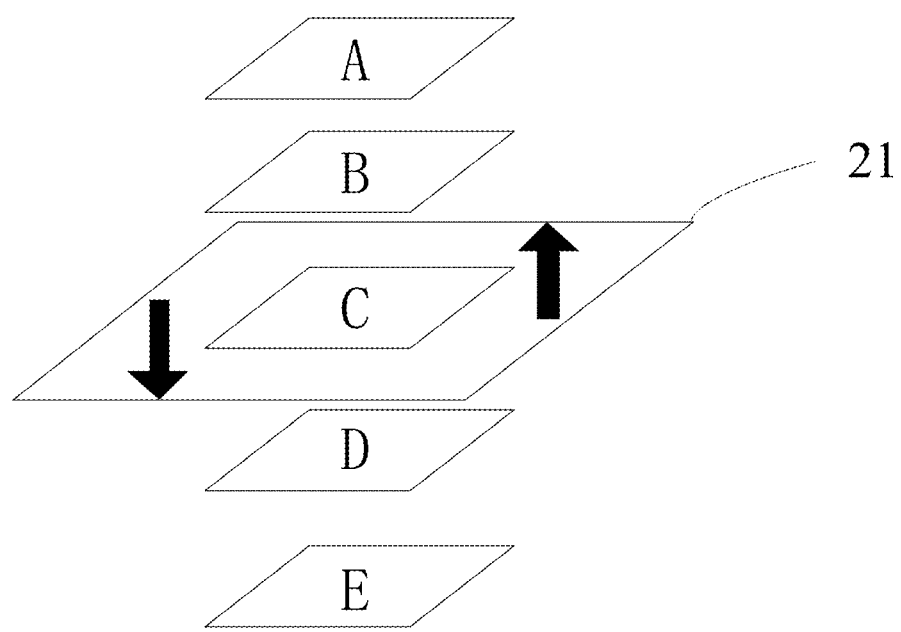
FIG. 7 is a schematic diagram of a mobile terminal moving upward or downward according to an embodiment of the disclosure.

FIG. 7 is a schematic diagram of a mobile terminal moving upward or downward according to an embodiment of the disclosure. Application A, application B, application C, application D, and application E are respectively arranged on mutually parallel surfaces, and application C is currently corresponding to the screen of the mobile terminal 21. As the mobile terminal moves upward by a preset displacement, application B or application A may correspond to the screen of the mobile terminal 21; as the mobile terminal moves downward by a preset displacement, application D or application E may correspond to the screen of the mobile terminal 21.

Figure 8:
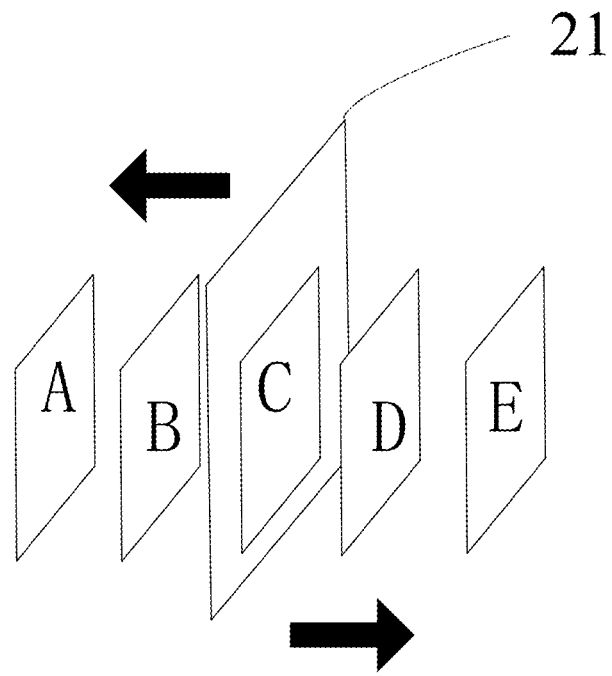
FIG. 8 is a schematic diagram of a mobile terminal moving leftward or rightward according to an embodiment of the disclosure.

FIG. 8 is a schematic diagram of a mobile terminal moving leftward or rightward according to an embodiment of the disclosure. Application A, application B, application C, application D, and application E are respectively arranged on mutually parallel surfaces, and application C is currently corresponding to the screen of the mobile terminal 21. As the mobile terminal moves leftward by a preset displacement, application B or application A may correspond to the screen of the mobile terminal 21; as the mobile terminal moves rightward by a preset displacement, application D or application E may correspond to the screen of the mobile terminal 21.

Figure 9:
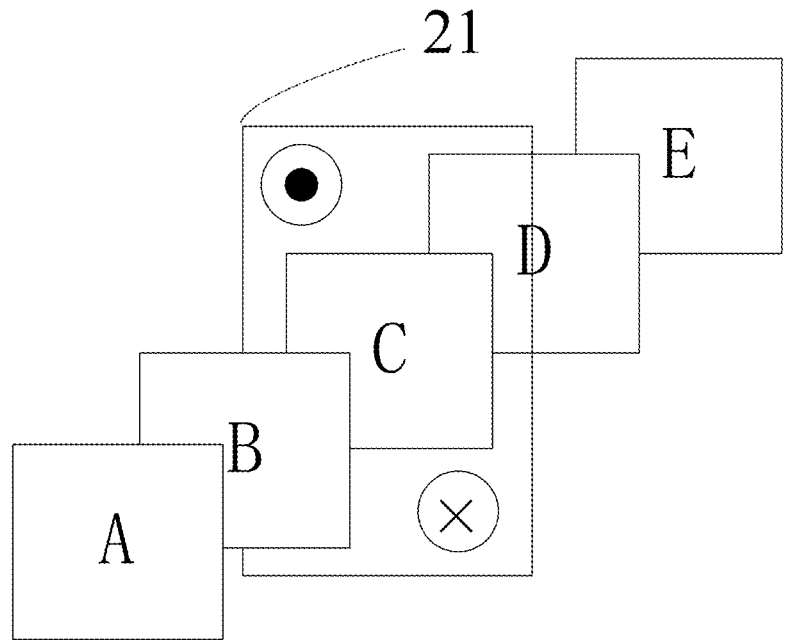
FIG. 9 is a schematic diagram of a mobile terminal moving forward or backward according to an embodiment of the disclosure.

FIG. 9 is a schematic diagram of a mobile terminal moving forward or backward according to an embodiment of the disclosure. Application A, application B, application C, application D, and application E are respectively arranged on mutually parallel surfaces, and application C is currently corresponding to the screen of the mobile terminal 21. As the mobile terminal moves forward by a preset displacement, application B or application A may correspond to the screen of the mobile terminal 21; as the mobile terminal moves backward by a preset displacement, application D or application E may correspond to the screen of the mobile terminal 21.

It can be understood that the above arrangement of applications is only an example. In this embodiment, the applications may also be arranged according to other arrangements, and the arrangement of the applications is not limited herein.

In this embodiment, the mobile terminal may specifically select the acquisition method of the moving displacement according to the magnitude of the acceleration acquired by the acceleration sensor. The following provides two methods for acquiring moving displacement according to the magnitude of acceleration.

In some embodiments, when the acceleration of the mobile terminal is less than or equal to the first acceleration threshold, the mobile terminal uses its own camera to acquire a video capturing ambient images surrounding the mobile terminal, wherein the video comprises a plurality of frames, and the plurality frames comprise feature points; then, according to the video capturing ambient images, position changes of the feature points in adjacent frames are acquired; finally, moving displacement of the mobile terminal is determined based at least in part on the position changes. For easy understanding, the embodiment is illustrated by the following example. If the mobile terminal takes 2 seconds to move in the first moving direction, the camera shoots a 2-second video which is composed of images shot according to the frequency of 30 frames per second, so that the video includes 60 frames in total. And a moving displacement of the mobile terminal between shooting moments of each two adjacent frames is determined according to the position change of the reference object in each two adjacent frames. Therefore, the total moving displacement of the mobile terminal during a shooting process of the 2-second video can be acquired by accumulating all the moving displacement.

In some embodiments, when the acceleration of the mobile terminal is greater than the first acceleration threshold, the moving speed of the mobile terminal is acquired through the acceleration sensor and timer set by itself; thereafter, the movement speed is integrated to acquire the moving displacement.

It should be noted that the first method of acquiring moving displacement is more suitable for a scenario where the mobile terminal moves at a slower speed and moves more smoothly. In this scenario, acquiring moving displacement through image processing has a higher accuracy; the second method of acquiring moving displacement are more suitable for the scenario where the mobile terminal moves at a faster speed. In this scenario, it is better to acquire the moving displacement by calculating and integrating acceleration and time. In addition, the moving displacement acquired in the first method of acquiring moving displacement can also be combined to further correct errors that may be caused by the second method.

The mobile terminal can move once or multiple times when moving, and each movement is performed according to any one of the foregoing six movement directions.

For example, as shown in FIG. 2, the application A is corresponding to screen of the mobile terminal 21 before moving. See FIG. 3, after the mobile terminal moves upward by a preset displacement, the application E is corresponding to the screen of the mobile terminal 21. Thereafter, the mobile terminal can continue to move upward, downward, leftward or rightward by a preset displacement, so that the application Q, application O, application A or application P is corresponding to the screen of the mobile terminal 21. If the mobile terminal moves multiple times within a preset time span, when acquiring its own moving direction and moving displacement, the mobile terminal correspondingly acquires the moving direction and displacement according to the time interval of each movement within the preset time span. For example, in a time span from T1 to T2 (T2 is the time later than T1 and earlier than T3), the moving direction of the mobile terminal is obtained as upward movement, and the movement displacement is y1; during a time span from T2 to T3, the moving direction of the mobile terminal is obtained as rightward movement, and the movement displacement is x2.

Step 2: The mobile terminal determines the target application corresponding to the screen of the mobile terminal according to the moving direction, the moving displacement, and an initial position associated with each application.

It should be noted that the initial position associated with each application refers to the original position of each application before the mobile terminal moves. According to the preset initial position associated with each application, the mobile terminal can acquire the relative position relationship of each application before the mobile terminal moves. The original position of each application may be preset according to some preset rule.

In one embodiment, each application can be arranged on the same surface according to the first preset rule. Referring to FIG. 2, the first preset rule can be as follows: application A is arranged on the surface at the position corresponding to the screen of the mobile terminal 21, and application B, application C, application D and Application E are respectively arranged 20 mm to the left, 20 mm to the bottom, 20 mm to the right and 20 mm to the top of application A on the surface.

In another embodiment, each application can be arranged on different surfaces according to the second preset rule. Referring to FIG. 7, the second preset rule can be as follows: application C is arranged on the surface at the position corresponding to the screen of the mobile terminal 21, and application B and application A are respectively arranged on surfaces 20 mm and 40 mm above the surface, and application D and application E are respectively arranged on surfaces 20 mm and 40 mm below the surface.

Figure 10:
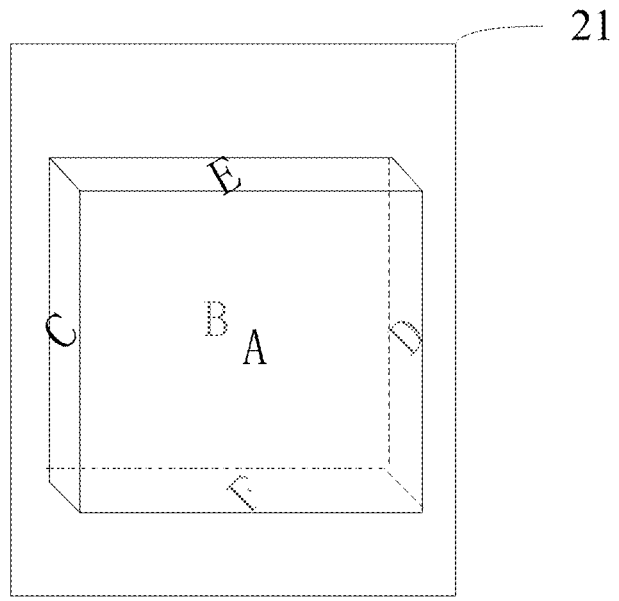
FIG. 10 is a schematic diagram illustrating initial positions associated with applications according to an embodiment of the disclosure.

In yet another embodiment, each application can be arranged in a stereoscopic space according to the third preset rule. Referring to FIG. 10, the third preset rule can be as follows: application A and application B are set on two parallel surfaces 20 mm apart, and application A is arranged on the surface corresponding to the screen of the mobile terminal 21; application C and application D are set on two parallel surfaces at a distance of 20 mm that are perpendicular to the surface of application A. And according to the third preset rule, each application may be arranged on preset surfaces of the stereoscopic space, wherein the preset surfaces includes at least one side faces of a hexahedron, and the mobile terminal is centered in the hexahedron.

It can be understood that, in this embodiment, the initial position associated with each application may also be preset in other ways, and the rules and manners on which the initial position associated with each application is set are not limited herein. In addition, in this embodiment, the original position of each application before the mobile terminal moves may not correspond to the screen of the mobile terminal. However, according to the initial position associated with each application, the mobile terminal can still know the direction and displacement of the mobile terminal required to display the interface of each application on the screen of the mobile terminal.

According to the initial position associated with each application, the mobile terminal can acquire the relative position relationship of each application before the mobile terminal moves, such as the relative direction and relative distance of each application on the same surface, and the relative direction and relative distance of each application on different surfaces in the same space, etc. Moreover, the mobile terminal can also acquire the relative direction and relative distance between the screen of the mobile terminal and each application, therefore, the mobile terminal performs corresponding calculations based on the moving direction, moving displacement, and initial position associated with each application acquired in S101 during actual movement, and then can determine the application corresponding to the screen after movement and display the interface of the application on the screen.

In other embodiments, the mobile terminal determines the application to be launched corresponding to the screen of the mobile terminal according to the moving direction, moving displacement and the initial position associated with each application, and the screen of the mobile terminal displays the interface of application to be launched. Moreover, the screen of the mobile terminal only displays the complete interface of one application at a time (see FIG. 2, FIG. 11 and FIG. 12). Refer to FIG. 2, before the mobile terminal moves, the application A is corresponding to the screen of the mobile terminal 21; refer to FIG. 11, the mobile terminal starts to move up, and the screen of the mobile terminal 21 still corresponds to application A; refer to FIG. 12, the mobile terminal continues to move up, and the screen of the mobile terminal 21 no longer corresponds to application A, but to application E. In other words, the screen of the mobile terminal will not display the complete interface of more than one application at a time, so the application corresponding to the screen of the mobile terminal determined by the mobile terminal can be identified as the application to be launched after the end of the movement.

Step 3: when the preset conditions are met, the target application or the application to be launched is launched.

In some embodiments, the preset conditions for the mobile terminal to launch the target application can be realized in a variety of ways. For example, as a specific implementation mode, the mobile terminal determines a current position of the mobile terminal based at least in part on the moving direction and the moving displacement, determines a first distance between the current position of the mobile terminal and the target application according to the current position of the mobile terminal and the preset initial position associated with the target application, and determines whether the first distance is less than the predetermined threshold; if so, launches the target application.

Figure 29:
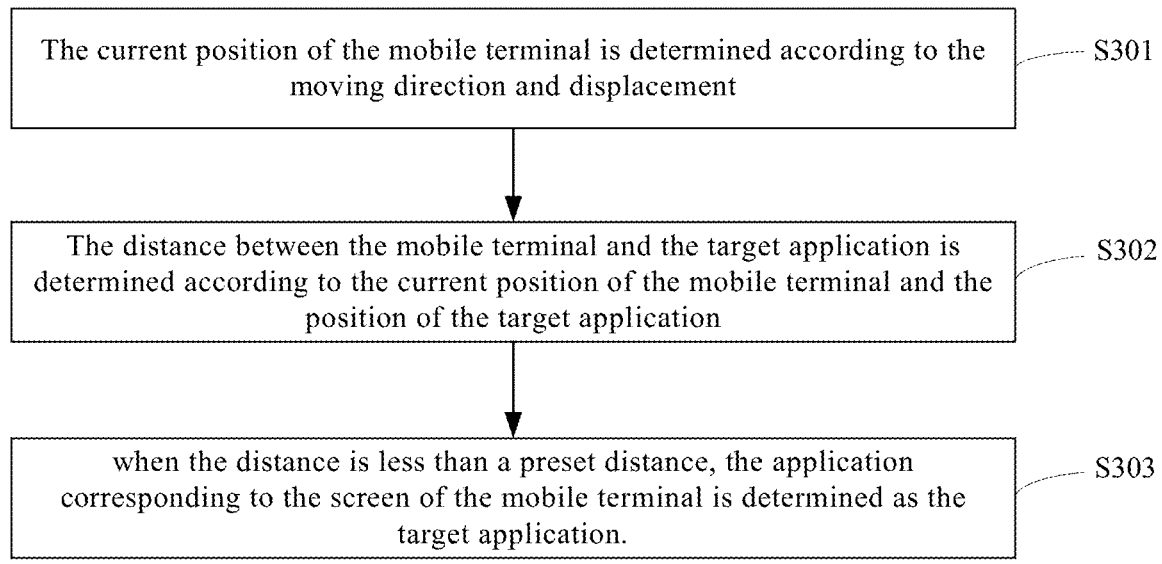
FIG. 29 is a flowchart for determining the target application according to an embodiment of the disclosure.

Specifically, in some embodiments, when the preset conditions are met, the mobile terminal determines the target application corresponding to the current screen as the target application, as shown in FIG. 29, which can include the following steps:

S301: a current position of the mobile terminal is determined based at least in part on the moving direction and displacement.

In this embodiment, when the position of the mobile terminal before moving is taken as the coordinate origin, a current position of the mobile terminal can be determined based at least in part on the moving direction and moving displacement. When the original position of the mobile terminal is not taken as the coordinate origin, it is necessary to acquire the position of the mobile terminal before moving, and then determine the current position of the mobile terminal based at least in part on the moving direction and displacement.

It should be noted that when the mobile terminal and each application are in the same surface, the current position of the mobile terminal can be determined by two-dimensional coordinates. For example, if the initial position associated with the mobile terminal is (0,0), the moving direction is upward, and the moving displacement is 0.1M, then the current position of the mobile terminal is (0,0.1). If the mobile terminal and each application are in different surface, the current position of the terminal can be determined by 3D coordinates. For example, if the initial position associated with the mobile terminal is (0,0,0), the moving direction is to move up 0.1 first, and then move 0.2 in the positive Z direction, then the current position of the mobile terminal is (0,0.1,0.2).

S302: the distance between the mobile terminal and the target application is determined according to the current position of the mobile terminal and the position of the target application.

In this embodiment, when the current position of the mobile terminal and the position of the target application are acquired, the distance between the two positions is calculated. In specific implementation, the position distance is calculated according to the coordinate information of the two positions.

S303: when the distance is less than a preset distance, the application corresponding to the screen of the mobile terminal is determined as the target application.

In this embodiment, when the distance between the mobile terminal and the target application is less than the preset distance, the application corresponding to the mobile screen may be determined as the target application.

The preset distance is set in advance, which can be set according to the actual situation, and different distance thresholds can be set for different mobile terminals, which is not limited herein by the embodiment.

In yet another embodiment, if the mobile terminal judges that the mobile terminal does not generate moving displacement within the preset time through its own acceleration sensor or gyroscope sensor, the target application or the application to be launched will be launched. This method needs to be implemented in combination with timer. For example, the mobile terminal determines that the mobile terminal stops the movement at time T3 according to the acceleration sensor or the gyro sensor, and identifies the application B as the application to be launched. The timer starts counting from time T3. If it is determined according to the acceleration sensor or the gyro sensor that the mobile terminal has not produced a moving displacement within the time period T3~T3+t (t is used as the preset time to determine whether to launch the target application or not), then application B is launched.

In addition, through the camera sensor set by itself, if it is determined that the mobile terminal does not generate moving displacement within the preset time, the target application or the application to be launched will be started. This method also needs to be implemented in combination with timer. For example, according to the external environment image taken by the camera sensor, the mobile terminal determines that the mobile terminal stops the movement at T3 corresponding to a certain frame Z1 in the environmental image, and takes application B as the application to be launched. The timer starts timing from T3 to determine whether each frame image changes in the T3~T3+T time period (t is used as the preset time to determine whether to launch the target application or the application to be launched or not), for example, whether a reference object is displaced. If there is no change, it can be determined that the mobile terminal has no moving displacement in the period of T3~T3+t, then application B is launched.

In yet another embodiment, the mobile terminal responds to the user operation event and launches the target application or the application to be launched. For example, when it is detected that the screen is being touched or stopped from being touched, or a preset button on the screen is triggered, the target application or the application to be launched is launched. For example, when a user determines that the application is the application to be launched according to the application interface displayed on the screen of the mobile terminal, the user can send a command to the mobile terminal to start the application by touching the screen or triggering the preset button on the screen. Therefore, when the mobile terminal detects that the screen is being touched or stopped from being touched, or a preset button on the screen is triggered or receives the start command sent by the user, the mobile terminal launches the application corresponding to the current display interface of the screen in response to the user's touch or stop touching, trigger operation or start command.

It can be understood that, in this embodiment, the mobile terminal may also launch the target application or the application to be launched in other ways, for example, in response to a specific gesture of the user, or according to the flip angle of the mobile terminal itself, etc. There is no limitation on the way in which the mobile terminal specifically launches the target application or the launched application.

When the mobile terminal launches the target application or application to be launched, the content displayed on the screen of the mobile terminal changes from the application interface to the real interface of the application. Furthermore, the user can interact with the application according to the specific content in the real interface of the launched application displayed on the screen.

Yet another embodiment of the disclosure may include the following steps:

Each application is arranged on the preset surface according to the preset rules.

In this embodiment, each application of the mobile terminal is arranged on a preset surface according to a preset rule of layout, so that the user can move the mobile terminal held by the user according to the position of each application on the preset surface.

Figure 26:
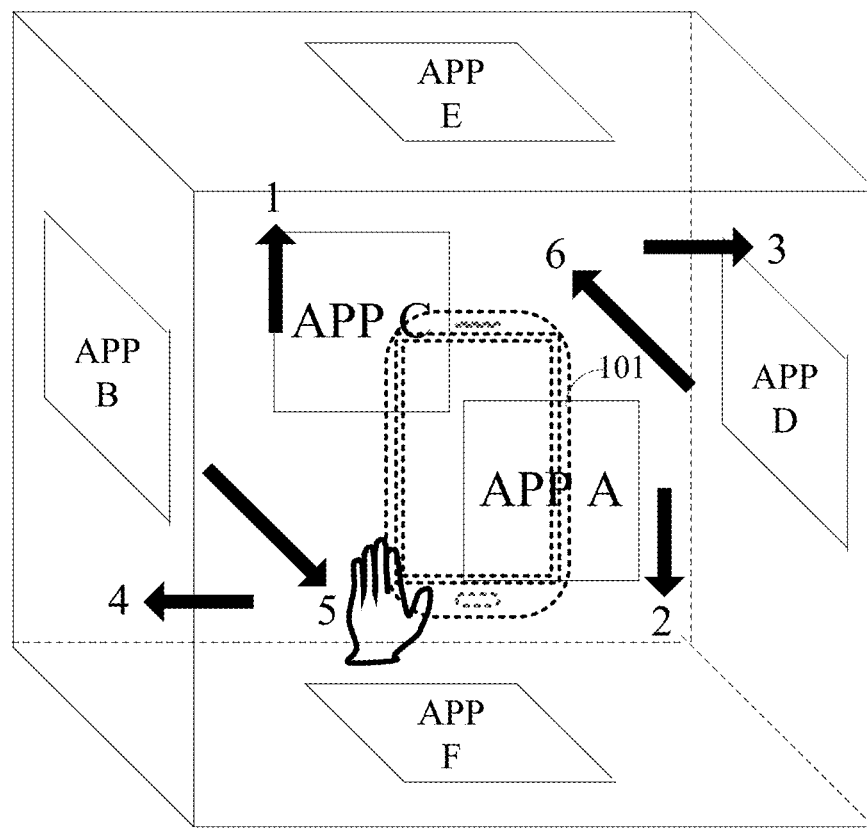
FIG. 26 is a fifth schematic diagram illustrating a moving direction of a mobile terminal according to an embodiment of the disclosure.
Figure 27:
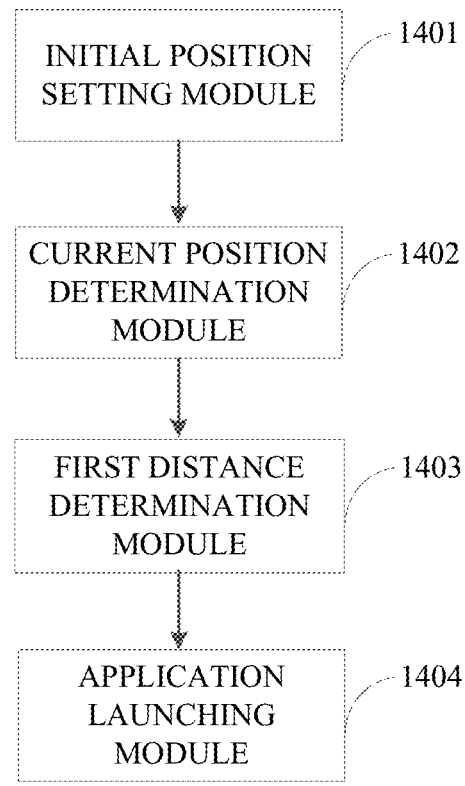
FIG. 27 is a block flow diagram of a device for launching an application according to an embodiment of the disclosure.

The preset surface includes one or more side faces of a hexahedron and the hexahedron is centered in the mobile terminal. The hexahedron can be regular hexahedron such as cuboid and cube, and a plurality of respective application in the preset surface is arranged on one or more side faces of the hexahedron. As shown in FIG. 26, when the applications are arranged in the stereoscopic space according to the third preset rule, the position on which the mobile terminal is located before moving, namely the center position of the cube, is set to be the original position of the mobile terminal, and the user can move the mobile terminal around based on arrow directions in the figure to launch the target application, wherein if the mobile terminal moves in the direction of an arrow 1, the corresponding moving direction is upward; correspondingly, if the mobile terminal moves in the direction of an arrow 2, the corresponding moving direction is downward; if the mobile terminal moves in the direction of an arrow 3, the corresponding moving direction is rightward; if the mobile terminal moves in the direction of an arrow 4, the corresponding moving direction is leftward; if the mobile terminal moves in the direction of an arrow 5, the corresponding moving direction is forward; and if the mobile terminal moves in the direction of an arrow 6, the corresponding moving direction is backward.

It should be noted that the above-mentioned embodiment is only interpreted as an exemplary scenario and does not constitute a limitation on the disclosure.

Based on the above method embodiment, the disclosure also provides a device for launching an application, applied to a mobile terminal, comprising:

acquisition module configured to acquire a moving direction and a moving displacement of the mobile terminal when moving;

determination module configured to determine the target application corresponding to the screen of the mobile terminal according to the moving direction, the moving displacement, and an initial position associated with each application, wherein the initial position associated with each operable object is the original position of each operable object before the mobile terminal moves, and to determine the application on the initial position as the target application when the preset condition is satisfied; and operation module configured to launch the target application when a second preset condition is satisfied.

Yet another embodiment of the disclosure provides a mobile terminal comprising at least one memory and at least one processor.

The memory is configured to store program code, and the processor is configured to call the program code stored in the memory to implement the method for launching an application provided by the above embodiments of the disclosure.

Yet another embodiment of the disclosure provides a storage medium, storing executable instructions used to implement the interaction the method for launching an application provided by the above embodiments of the disclosure.

Yet another embodiment of the disclosure provides a computer program product including instructions executable by computer to cause the computer to implement the method for launching an application provided by the above embodiments of the disclosure.

Yet another embodiment of the disclosure also provides a method for mobile terminal to launch an application. Refers to FIG. 1, FIG. 1 is a flow chart of the method for launching an application by the mobile terminal, which includes the following steps:

S101: The mobile terminal acquires a moving direction and moving displacement when it moves. The relative position relationship of the applications, the moving direction and moving displacement of the mobile terminal are determined in the same manner as in step 1 above. For the related parts, please refer to step 1, which will not be repeated here.

S102: The mobile terminal determines the application to be launched corresponding to the screen of the mobile terminal according to the moving direction, the moving displacement, and an initial position associated with an application, and the screen of the mobile terminal displays the interface of the application to be launched.

In this embodiment, the preset rules for the initial position associated with the applications are the same as those in step 2. For the related parts, please refer to step 2, which will not be repeated here.

Figure 11:
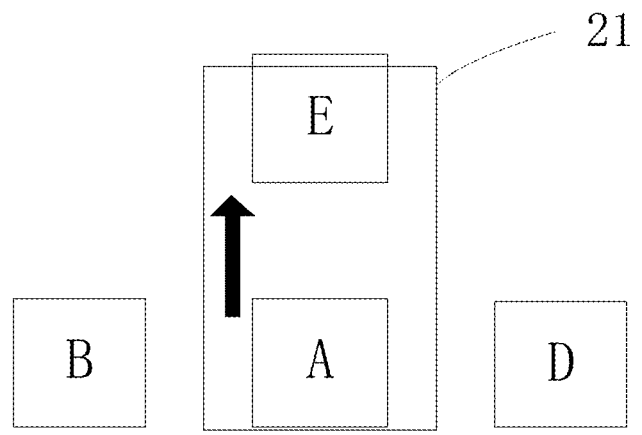
FIG. 11 is a schematic diagram illustrating the process of a mobile terminal moving upward according to an embodiment of the disclosure.
Figure 11:
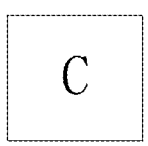
Figure 12:
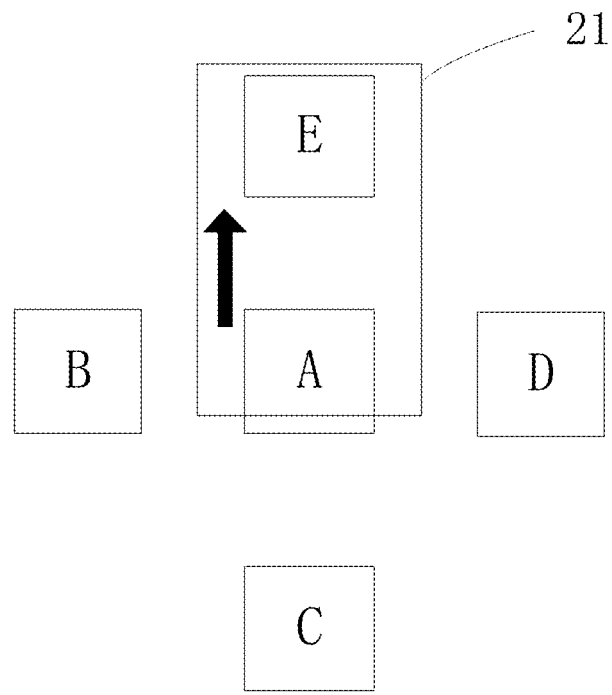
FIG. 12 is a schematic diagram illustrating the process of a mobile terminal moving upward according to an embodiment of the disclosure.

It should be noted that the screen of the mobile terminal only displays the complete interface of one application at a time (see FIG. 2, FIG. 11 and FIG. 12). Refer to FIG. 2, before the mobile terminal moves, the application A is being displaying on the screen of the mobile terminal 21; refer to FIG. 11, the mobile terminal starts to move up, and the screen of the mobile terminal 21 still corresponds to application A; refer to FIG. 12, the mobile terminal continues to move up, and the screen of the mobile terminal 21 no longer corresponds to application A, but to application E. In other words, the screen of the mobile terminal will not display the complete interface of more than one application at a time, so the application corresponding to the screen of the mobile terminal determined by the mobile terminal can be identified as the application to be launched after the end of the movement.

S103: The mobile terminal launches the application to be launched.

The implementation manner of the mobile terminal to launch the application to be launched is the same as the implementation in step 3 above. For related parts, please refer to step 3, which will not be repeated here.

The above is a method for launching an application by a mobile terminal according to an embodiment of the disclosure. According to the method, a mobile terminal acquires a moving direction and moving displacement of the mobile terminal when moving, and then the mobile terminal determines, according to the moving direction, moving displacement, and the initial positions associated with the applications, the application to be launched corresponding to the screen after the movement, wherein the initial position associated with an application refers to the original position of the application before the mobile terminal moves; and then the interface of the application to be launched is displayed on the screen of the mobile terminal; further, the mobile terminal launches the application to be launched.

It can be seen that in the method for launching an application of the mobile terminal provided by the embodiments of the disclosure, the mobile terminal can acquire the moving direction and displacement by moving and thus determine and launch the application to be launched without the user performing complex manual operation to trigger the application startup. Therefore, the dependence of the application startup on the manual touch operation of the user is reduced, the convenience of the application startup is improved, and the user experience is upgraded.

In some embodiments, in order to prevent the mobile terminal from being locked in the screen and performing an incorrect operation to launch an application according to the above method, resulting in increased power consumption, the mobile terminal may determine the working state of the mobile terminal in advance before acquiring the moving direction and moving displacement of the mobile terminal when it moves. If the mobile terminal is in an unlocked state, the above S101 is executed, and if the mobile terminal is in a locked state, there is no need to perform S101, and then there is no need to use the above method to launch an application.

In addition, according to the method for launching an application by a mobile terminal provided in this embodiment, while executing S103, applications that the mobile terminal runs before the current move can be terminated according to the user's preset settings or based on the historical data analysis results of the running time of the application to be launched to save power. As an example, the user presets that when the mobile terminal finishes jumping from the application A to other applications, the application A is terminated. As another example, according to the historical data of the running time of application B, the mobile terminal analyzes that the average time of using application B by mobile terminal users is more than 30 minutes. Therefore, the background does not need to run the application running before the movement when application B is running. When the mobile terminal finishes jumping from the application C to the application B, the application C is terminated.

It should be noted that, the various application arrangement manners provided in the above embodiments can realize that the corresponding application is automatically launched as the mobile terminal moves. The arrangement data of applications is stored in the mobile terminal in advance. For example, when application A corresponds to the screen of the mobile terminal, the controller of the mobile terminal knows the applications around application A in advance. Therefore, when the corresponding movement of the mobile terminal is detected, the application around A is launched.

It should be noted that the A-Q in the above figure only indicates the relative position of applications, and does not represent the application interface.

The disclosure also provides a file transmission method, which further includes the step of determining a target file to be transferred in response to user selection of file before the step 1 of the method for launching an application that the mobile terminal acquires the moving direction and moving displacement when it moves.

In this embodiment, the user uses the mobile terminal to determine the target file to be transferred in a current application. For example, an application currently displayed on the screen of the mobile terminal is a file reading application, and file X is determined as a target file to be transferred in response to user selection of the file X from the file reading application.

It needs to be illustrated that the target file in the embodiment can include a file with literal information, such as a Word file, a PDF file, a TXT file, an Excel file and a PPT file, which can further be a file type including literal information in other forms.

In addition, when the preset condition is satisfied in the step 3 of the method for launching an application, after launching the target application, the method further includes the step of transmitting the target file to the target application.

In this embodiment, when the preset condition is satisfied, the mobile terminal determines that the target application corresponding to the current screen as the target application, and then transmits the selected target file to the target application.

Based on the forgoing method embodiments, the disclosure further provides a file transmission device which will be illustrated with reference to drawings as follows.

Figure 30:
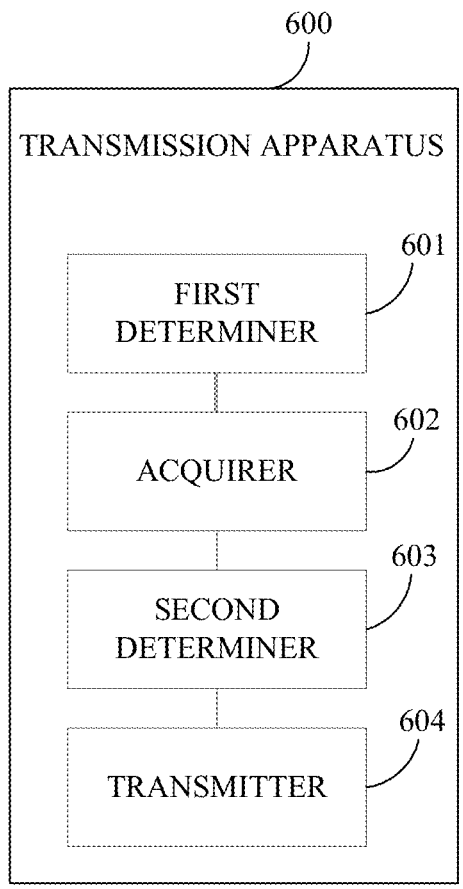
FIG. 30 is a structural diagram of a file transmission device according to an embodiment of the disclosure.

Referring to FIG. 30, which is a structural diagram of a file transmission apparatus provided by an embodiment of the present disclosure, the device is applied to a mobile terminal including numerous applications and a target file, and the device may include:

a first determining module/determiner 601 configured to determine a target file to be transferred;

an acquiring unit/acquirer 602 configured to acquire a moving direction and a moving displacement.

a second determining unit/determiner 603 configured to determine a target application corresponding to the mobile terminal according to the moving direction, the moving displacement and an initial position associated with an application; and a transmitting unit/transmitter 604 configured to determine an application corresponding to the screen of the mobile terminal as a target application when a preset condition is satisfied and transferring the target file to the target application.

Optionally, in some embodiments, the transmitting unit is configured for determining the current position of the mobile terminal based at least in part on the moving direction and the moving displacement.

According to the current position of the mobile terminal and the position of the target application, the positional distance between the mobile terminal and the target application can be acquired, and whether the positional distance is shorter than a predetermined distance is judged; if so, the application corresponding to the screen of the mobile terminal is determined as the target application, and the target file is transferred to the application.

Optionally, in some embodiments, the transmitting unit is configured to transfer the target file to the target application when the screen of the mobile terminal is detected to be touched, or transferring the target file to the target application when a pre-set button on the screen of the mobile terminal is detected to be touched, or transferring the target file to the target application in response to determining that the mobile terminal has not moved within a predetermined period of time.

In some embodiments, the process of acquiring a moving direction when the mobile terminal moves includes according to data sent from a gyroscope sensor disposed in the mobile terminal, acquiring the moving direction when the mobile terminal moves.

In some embodiments, the process of acquiring a moving displacement when the mobile terminal moves includes:

according to data sent from an acceleration sensor disposed in the mobile terminal, acquiring a moving acceleration and a moving time of the mobile terminal; and integrating the moving acceleration and the moving time to acquire the moving displacement.

In some embodiments, the process of acquiring a moving displacement when the mobile terminal moves includes:

acquiring ambient images surrounding the mobile terminal by a camera sensor disposed in the mobile terminal when the mobile terminal moves; acquiring a moving displacement of the mobile terminal between each two adjacent frames of images of the ambient images; and adding up all the moving displacements between each two adjacent frames of images to acquire the moving displacement.

In some embodiments, the device further includes a arranging unit configured to arrange applications on a preset surface according to a preset rule.

In some embodiments, the moving direction at least includes one of an upward movement, a downward movement, a leftward movement, a rightward movement, a forward movement and a backward movement.

In some embodiments, the file data include any one of a Word file, a PDF file, a TXT, an Excel file and a PPT file.

According to the device provided by the embodiment of the disclosure, when the user wants to share some file, the user can determine the target file in the present application by the mobile terminal; then the user moves the mobile terminal to acquire the moving direction and the moving displacement when the mobile terminal moves. The application currently corresponding to the screen of the mobile terminal is determined according to the moving direction, the moving displacement and initial positons of applications. When the predetermined condition is satisfied, the application corresponding to the screen of the mobile terminal is determined as the target application, and the determined target file is transferred to the target application for outputting the file. According to the file transmission device provided in the disclosure, when a file needs to be transferred, it is unnecessary for the user to select for multi-times and switch between different applications; it merely needs to move the mobile terminal. When a certain predetermined condition is satisfied, and the target application is determined, the file can be transferred to the target application. The transmission process is simplified to improve transmission efficiency, as well as upgrading the user experience. The transmitted data can further be target multimedia information. The multimedia information practically is multimedia information to be shared in a target multimedia application. Common multimedia information includes pictorial information, video information and audio information. Therefore, in the embodiment, the target multimedia information includes at least one of pictorial information, video information and audio information. For instance, in response to an operation that the user selects some picture from a photos interface shown in the mobile terminal, the pictorial information is determined to be the target multimedia information.

Additionally, it needs to clarify that each steps in each method and hardware modules described in detail in the disclosure are fitted for the forgoing files, multimedia information and various types of data able to be shared, which will not be respectively repeated.

An embodiment of the disclosure also provides a mobile terminal. The specific implementation of the mobile terminal will be described below with reference to FIG. 13.

Figure 13:
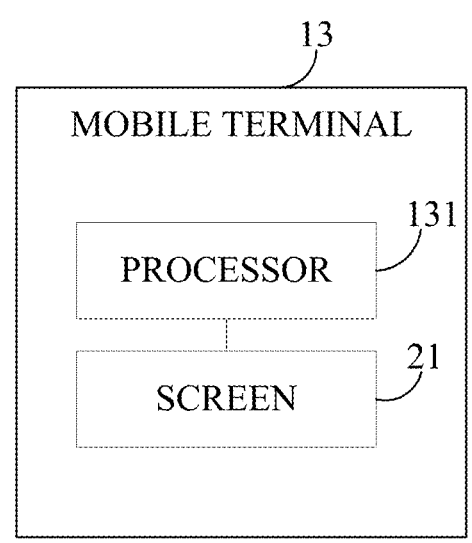
FIG. 13 is a structural diagram of a mobile terminal according to an embodiment of the disclosure.

Mobile Terminal Embodiment:

Refer to FIG. 13, which is a schematic structural diagram of a mobile terminal according to an embodiment of the disclosure. The mobile terminal 13 includes: a processor 131 and a screen 21.

The processor 131 is configured to acquire a moving direction and the moving displacement of the mobile terminal; determine the launched application corresponding to the screen 21 of the mobile terminal according to the moving direction, the moving displacement and the initial positions associated with applications; and launch the application to be launched;

The screen 21 is configured to display the interface of the application to be launched corresponding to the screen 21 determined by the processor 131, and to display only one interface of the application to be launched at a time.

This embodiment is also applicable to a method for transferring files between applications Based on the above embodiment, the mobile terminal provided by the present disclosure does not require the user to perform complex manual operation to launch an application. The processor obtains a moving direction and displacement of the mobile terminal, and then determines and launched the application to be launched. Therefore, the dependence of the application startup on the user's manual touch operation is reduced, the convenience of the application startup is improved, and the user experience is effectively upgraded.

The embodiment of the disclosure also provides a non-transitory computer-readable storage medium for storing computer programs, and the executable instructions contained in the above programs can be executed by a processor to complete the method for launching an application by mobile terminal provided by the above embodiments. For instance, the non-transitory computer-readable storage medium may be ROM, random access memory (RAM), CD-ROM, magnetic tape, floppy disk, optical data storage device, etc.

A non-transitory computer-readable storage medium, when instructions in the storage medium are executed by a processor of a mobile terminal, enable the mobile terminal to execute a method for launching an application by mobile terminal, the method including:

acquiring a moving direction and a moving displacement of the mobile terminal when the mobile terminal moves in the moving direction for the moving displacement;

determining an application to be launched corresponding to the screen of the terminal according to the moving direction, moving displacement, and an initial position associated with an application, and displaying the interface of the application to be launched on the screen of the mobile terminal, wherein the initial position associated with an application refers to the original position of the application before the mobile terminal moves and the screen of the mobile terminal displays only one complete interface of the application at a time; and launching the application to be launched.

An embodiment of the disclosure further provides a processor configured for executing instructions included in a computer program stored in a non-transitory computer-readable storage medium to implement the following steps:

acquiring a moving direction and a moving displacement of the mobile terminal when the mobile terminal moves in the moving direction for the moving displacement;

determining an application to be launched corresponding to the screen of the terminal according to the moving direction, moving displacement, and an initial position associated with an application, and displaying the interface of the application to be launched on the screen of the mobile terminal, wherein the initial position associated with an application refers to the original position of the application before the mobile terminal moves and the screen of the mobile terminal displays only one complete interface of the application at a time; and launching the application to be launched.

Figure 14:
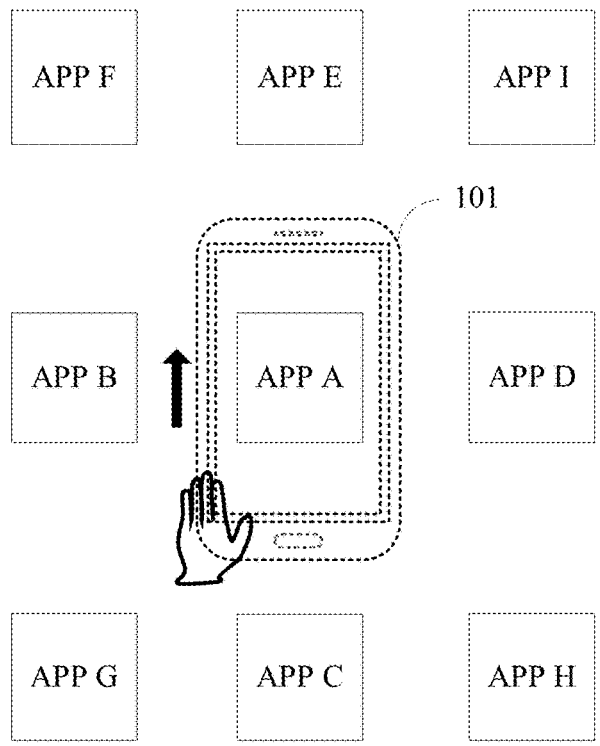
FIG. 14 is a schematic diagram of an actual application scenario of a method for launching an application according to an embodiment of the disclosure.

Referring to FIG. 14 which illustrates a diagram of an exemplary application scene of an embodiment of the disclosure, as shown in FIG. 1, a method for launching an application provided by the disclosure can be applied to an application scene comprising a mobile terminal 101 and applications (application A, application B and the like as shown in FIG. 14) located outside a screen display of the mobile terminal 101, wherein the mobile terminal 101 is any user equipment that can perform human-computer interaction and then launch an application according to user intention, such as a smart phone, a tablet personal computer, and a laptop personal computer; a plurality of positions associated with a plurality of applications may be preset outside the screen display of the mobile terminal by the mobile terminal, for example, the applications can be arranged on a virtual surface, as shown in FIG. 1, or in other position arrangement modes, such as stereoscopic spatial arrangement, wherein the display content of an application interface may be an image corresponding to initial launching of the application, or an interface corresponding to a running state after the application startup. The specific display image and position arrangement mode can be set according to actual conditions and are not limited herein.

In practical application, the mobile terminal 101 presets a plurality of respective initial positions associated with a plurality of outside a screen display area of the mobile terminal, for example, the applications can be spread on a virtual surface, as show in FIG. 1, so that the mobile terminal 101 can be close to the different applications when the user moves the mobile terminal 101. As shown in FIG. 1, the user can move the mobile terminal 101 in the direction of the arrow shown in the figure to move the mobile terminal 101 upward in the direction close to an application E. In the moving process of the mobile terminal 101, a certain application around the mobile terminal 101 can be set as a target application in real time according to the current position of the mobile terminal 101, for example, if the user determines the current position of the mobile terminal 101 to be the position of an application A in the figure, then the four applications on the upper side, lower side, left side and right side of the application A are respectively an application E, an application C, an application B and an application D, and one of the applications, for example the application D, can be set as the target application. Then, when the mobile terminal 101 detects that the user moves the mobile terminal 101 rightwards, the distance between the mobile terminal 101 and the target application D can be gradually shortened according to the operation, the distance between a current position of the mobile terminal 101 and a preset initial position associated with the target application D is determined as a first distance, and when the first distance is less than a predetermined threshold, the target application D can be launched and displayed on the mobile terminal 101 for users to use. For example, if the predetermined threshold is assumed to be 2 cm, when the distance between the mobile terminal 101 and the target application D, i.e., the first distance, is less than 2 cm, the target application D can be started and displayed on the mobile terminal 101 for user to use.

Therefore, the disclosure realizes the convenient startup of the target application according to the will of the user, solves the problems that the current startup process of the application is too complicated and inconvenience, improves the convenience of user operations, and thus upgrades the user experience. It should be understood by those skilled in the art that the frame diagram shown in FIG. 14 is merely one example in which the embodiments of the disclosure can be implemented. The limitation of the embodiments of the disclosure is not limited by any aspect of the diagram.

Based on the above application scene, an embodiment of the disclosure provides a method for launching an application which is described in detail below in combination with the accompanying drawings.

Figure 15:
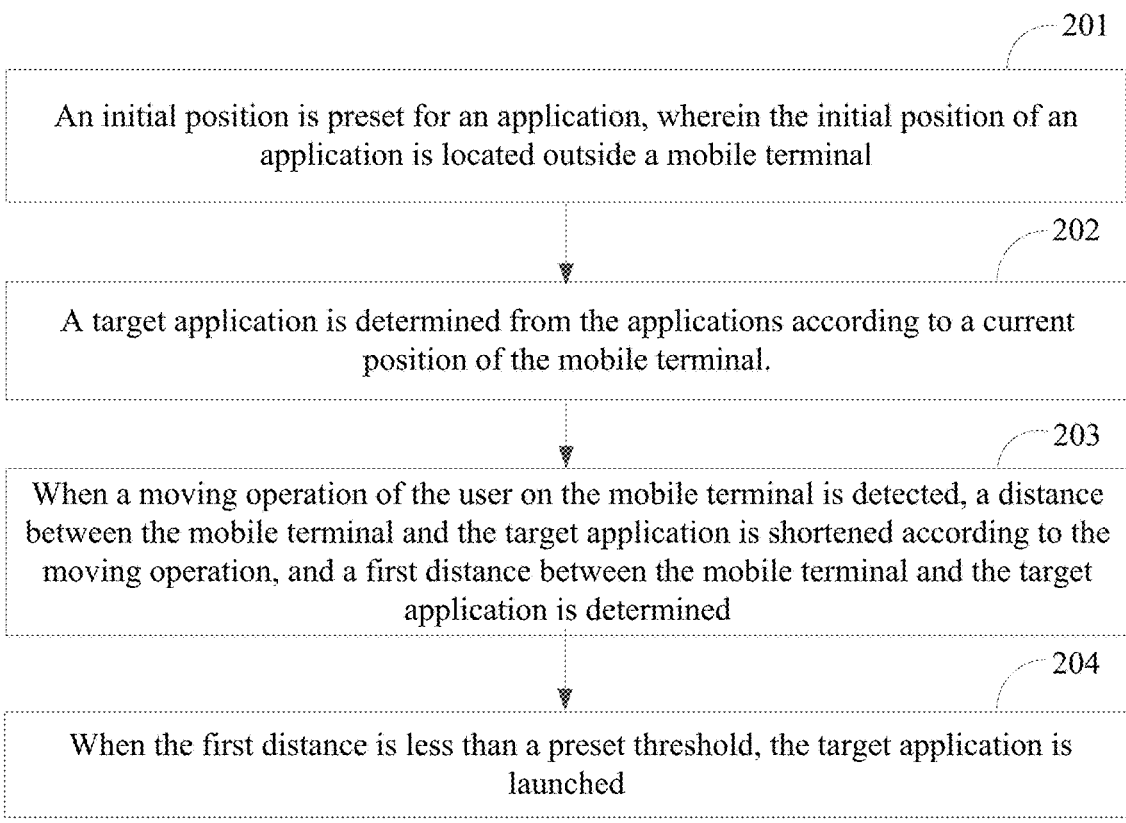
FIG. 15 is a block flow diagram of a method for launching an application according to an embodiment of the disclosure.

FIG. 15 illustrates a flow chart of a method for launching an application provided by an embodiment of the disclosure. As shown in FIG. 15, the method comprises the following steps.

S201, an initial position is preset for an application, wherein the initial position associated with an application is located outside a screen display of a mobile terminal.

In practical application, when using the mobile terminal, people frequently face the requirement of skipping from the current application to another application, such as skipping from an interface of a social network APP to an interface of a navigation APP to search a travel route, and the like. With the development of network technology, various applications emerge endlessly, and a plurality of different applications such as financial applications, shopping applications and learning applications may be installed on one mobile terminal at the same time, and in order to improve the convenience of launching the applications, in the disclosure, an initial position is preset for an application outside a screen display of the mobile terminal, and a frame corresponding to initial launching of an application or a frame corresponding to a certain running state after an application start up is used as an interface of the application.

During the process of setting the initial positions for applications, the disclosure provides three embodiments as follows.

In one embodiment, the applications are arranged on a same surface according to a first preset rule.

Figure 16:
FIG. 16 is a first schematic diagram illustrating the initial positions associated with applications according to an embodiment of the disclosure.
Figure 16:
Figure 16:

In the embodiment, the first preset rule is that the applications are arranged on a virtual surface. For example, as shown in FIG. 16 which is a schematic diagram illustrating the initial positions associated with the applications provided by the embodiment of the disclosure, if an application A is located at a center position of the virtual surface, an application B, an application C, an application D and an application E can be arranged respectively on the left side, lower side, right side and upper side of the application A on the surface correspondingly, and similarly, an application F, an application G, an application H and an application I can be arranged respectively at the upper left side, lower left side, lower right side and upper right side of the application A.

In another embodiment, the applications are arranged on different surfaces according to a second preset rule, and the different surfaces are parallel to one another.

Figure 17:
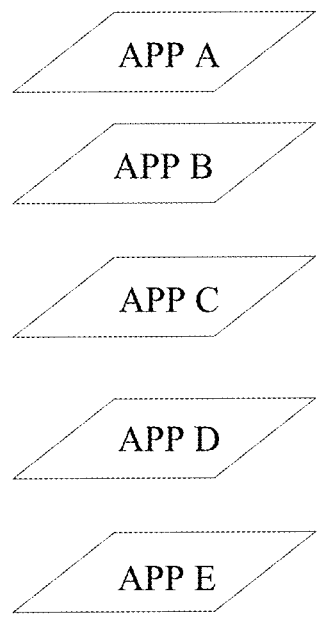
FIG. 17 is a second schematic diagram illustrating the initial positions associated with applications according to an embodiment of the disclosure.
Figure 18:
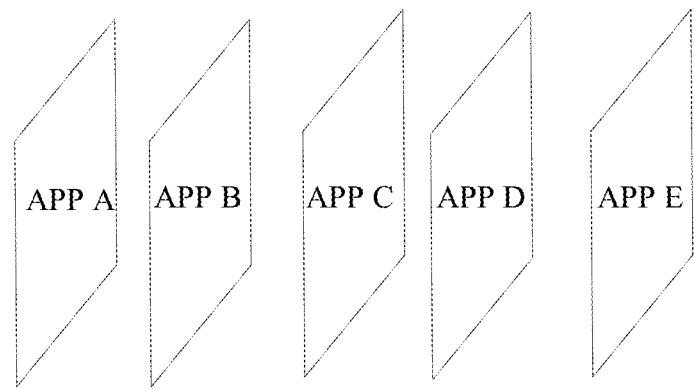
FIG. 18 is a schematic diagram illustrating the initial positions associated with applications according to an embodiment of the disclosure.
Figure 19:
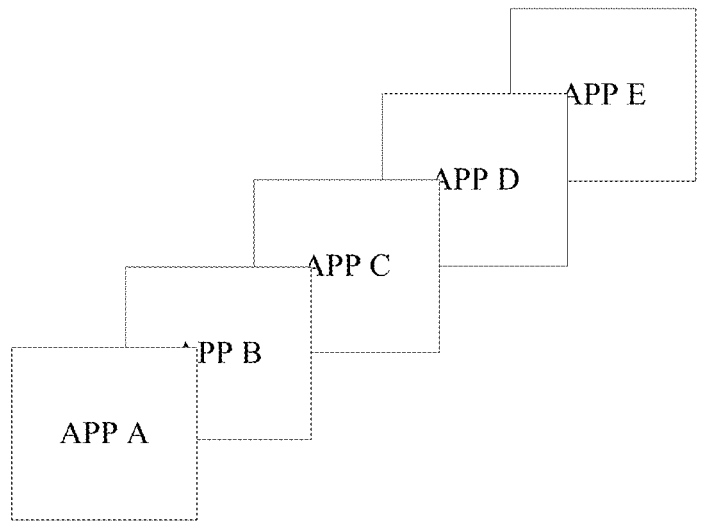
FIG. 19 is a schematic diagram illustrating the initial positions associated with applications according to an embodiment of the disclosure.

In the embodiment, the second preset rule is that the applications are arranged on different surfaces, and the different surfaces are parallel to one another. For example, as shown in FIG. 17 which is another schematic diagram illustrating the initial positions associated with the applications provided by the embodiment of the disclosure, the application A, the application B, the application C, the application D and the application E are correspondingly located on different surfaces, and the different surfaces on which the applications are arranged are parallel to one another in an up-down direction, or as shown in FIG. 18, the surfaces on which the applications are located can also be parallel to one another in a left-right direction, or as shown in FIG. 19, the surfaces on which the applications are located can also be parallel to one another in a front-back direction.

In addition, still in another embodiment, applications are arranged in a preset stereoscopic space according to a third preset rule.

Figure 20:
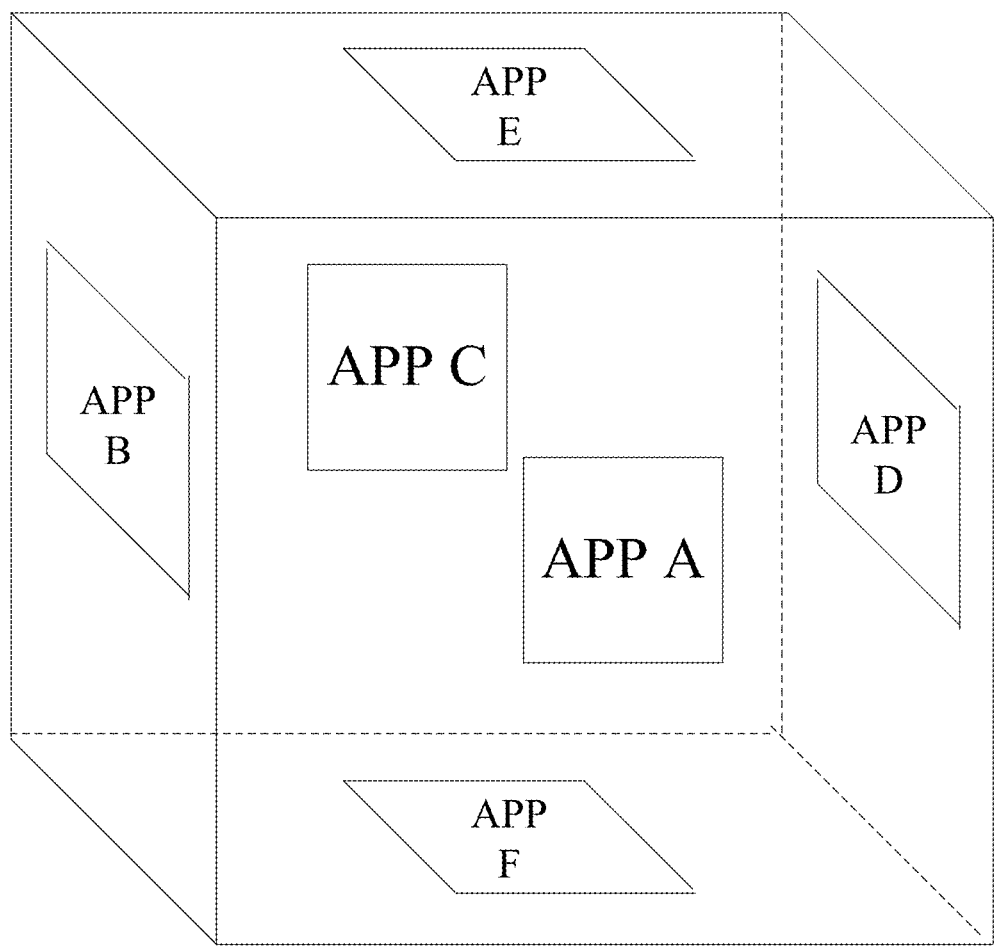
FIG. 20 is a schematic diagram illustrating the initial positions associated with applications according to an embodiment of the disclosure.

In the embodiment, the third preset rule is that the applications are arranged in the stereoscopic space. For example, as shown in FIG. 7 which is another schematic diagram illustrating the initial positions associated with applications provided by the embodiment of the disclosure, the application A, the application B, the application C, the application D, the application E and the application F may be correspondingly arranged on different surfaces, and the surfaces on which the applications are located can form a stereoscopic space, such as a cube in the stereoscopic space as shown in FIG. 20.

It should be understood that the above arrangement of applications is exemplary only. And in some embodiments, the applications may also be arranged in accordance with other arrangement, which is not limited After presetting the initial position for the applications, S202 can be further executed.

S202: a target application is determined from the applications according to a current position of the mobile terminal.

In practical application, after presetting the initial positions for the applications in the S201, the applications around, such as on the left side, lower side, right side, upper side, upper left side, lower left side, lower right side and upper right side of the mobile terminal can be determined according to the current position of the mobile terminal, so that one of the applications can be selected by the user to serve as the target application, and convenient startup of the target application can be achieved by using the embodiment.

In one embodiment of the disclosure, the current position of the mobile terminal in the S202 can be determined according to the following steps:

step A: a first moving direction and a first moving distance of the mobile terminal which moves based on an original position are acquired, wherein the original position is a position at which the mobile terminal is located before moving; and step B: the current position of the mobile terminal is determined according to the first moving direction and the first moving distance.

In the embodiment, the position at which the mobile terminal is located before moving is the original position. When the user moves the mobile terminal, a self-moving direction based on the original position can be acquired by the mobile terminal to serve as the first moving direction; similarly, a self-moving distance based on the original position can be acquired by the mobile terminal to serve as the first moving distance; and a position to which the mobile terminal moves, namely the current position of the mobile terminal, can be determined according to the acquired moving direction and moving distance, namely the first moving direction and the first moving distance.

Figure 21:
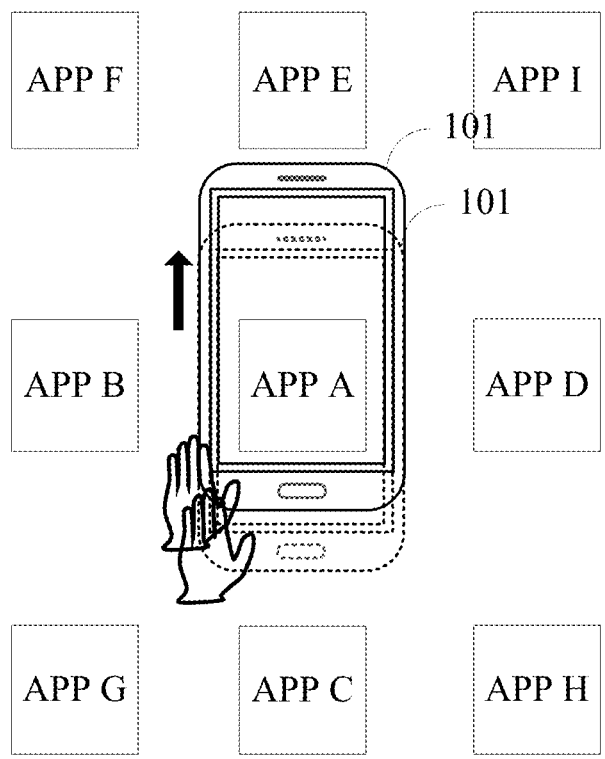
FIG. 21 is a schematic diagram of determining a current location of a mobile terminal according to an embodiment of the disclosure.

For example, as shown in FIG. 21 which is a schematic diagram of determining the current position of the mobile terminal provided by the embodiment of the disclosure, The position on which the mobile terminal is located before moving, namely the position of the application A, is set to be the original position of the mobile terminal, and the user can move the mobile terminal in the direction of an arrow shown in the figure; and during the moving process, the self-moving direction based on the original position can be acquired by the mobile terminal to serve as the first moving direction, as shown in FIG. 21, the first moving direction refers to upward movement, and meanwhile, the self-moving distance based on the original position can be acquired to serve as the first moving distance. Then, the position to which the mobile terminal moves, namely the current position of the mobile terminal, can be determined. As shown in FIG. 8, if the user moves the mobile terminal 101 upwards to the position of the application E, the current position of the mobile terminal can be determined to be the position of the application E.

Furthermore, the user can check the applications arranged around the current position according to the current position of the mobile terminal. For example, still as shown in FIG. 21, if the current position of the mobile terminal is determined to be the position of the application E, the user can check the applications arranged around the current position, such as the application F on the left side and the application I on the right side, and then if the user wants to start one application by using the method provided by the embodiment, the mobile terminal can determine the application to be the target application, for example, the application I on the right side can be determined to be the target application.

In some possible embodiments of the disclosure, the first moving direction in the step A may be determined to be at least one of an upward movement, a downward, a leftward movement, a rightward movement, a forward movement and a backward movement according to the different arranged initial positions associated with the applications.

Figure 22:
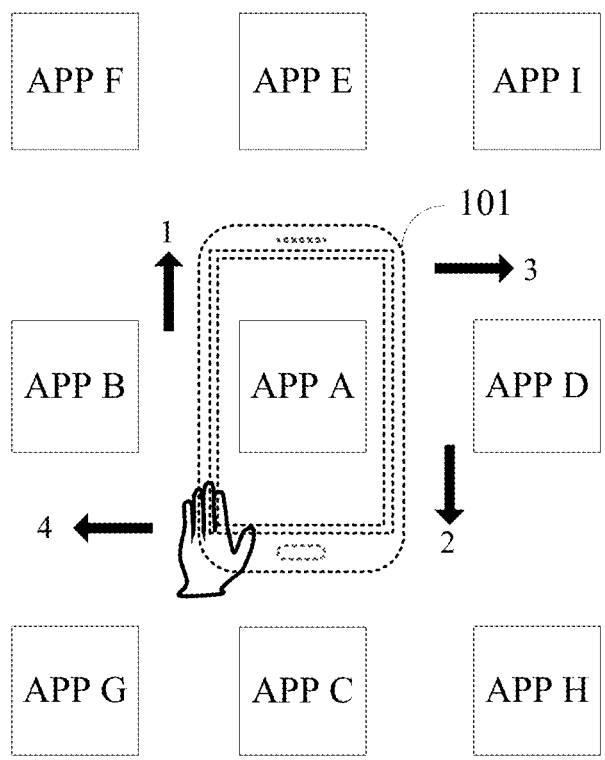
FIG. 22 is a first schematic diagram illustrating a moving direction of a mobile terminal according to an embodiment of the disclosure.

For example, as shown in FIG. 22, when the applications are arranged on the same surface according to the first preset rule, the position on which the mobile terminal is located before moving, namely the position of the application A, is set to be the original position of the mobile terminal, and the user can move the mobile terminal based on arrow directions in the figure to launch the target application, wherein if the mobile terminal moves in the direction of an arrow 1, the corresponding moving direction is upward; correspondingly, if the mobile terminal moves in the direction of an arrow 2, the corresponding moving direction is downward; if the mobile terminal moves in the direction of an arrow 3, the corresponding moving direction is rightward; and if the mobile terminal moves in the direction of an arrow 4, the corresponding moving direction is leftward movement.

Figure 23:
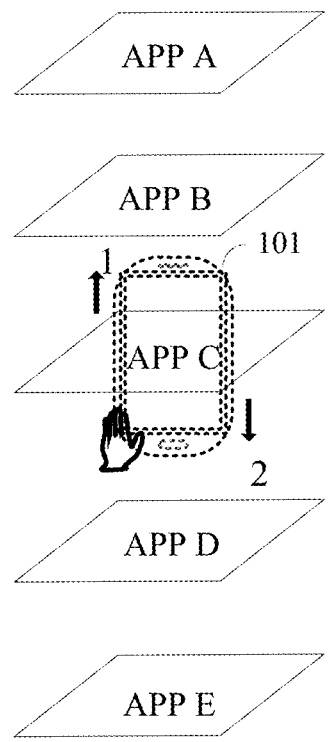
FIG. 23 is a second schematic diagram illustrating a moving direction of a mobile terminal according to an embodiment of the disclosure.

Further as shown in FIG. 23, when the applications are arranged on the different surfaces according to the second preset rule, and the different surfaces are parallel to one another in the up-down direction, the position on which the mobile terminal is located before moving, namely the position of the application C, is set to be the original position of the mobile terminal, and the user can move the mobile terminal based on arrow directions in the figure to launch the target application, wherein if the mobile terminal moves in the direction of an arrow 1, the corresponding moving direction is upward, and correspondingly, if the mobile terminal moves in the direction of an arrow 2, the corresponding moving direction is downward movement.

Figure 24:
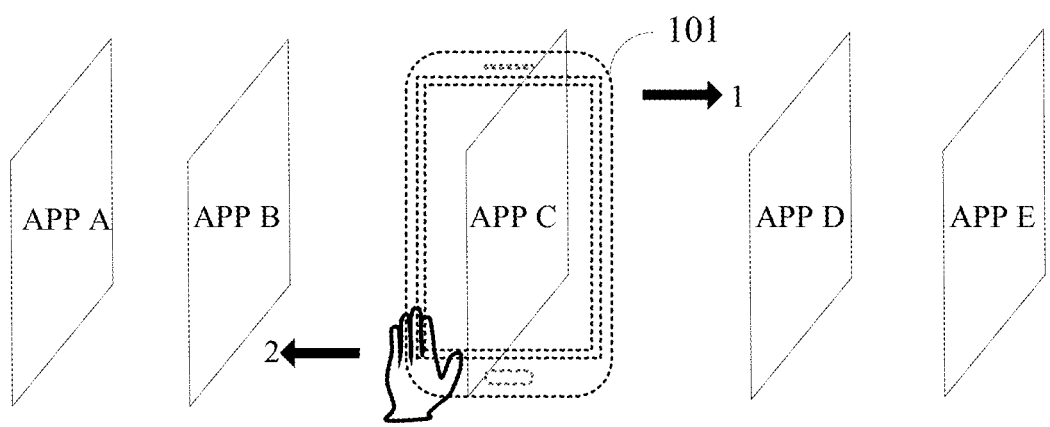
FIG. 24 is a third schematic diagram illustrating a moving direction of a mobile terminal according to an embodiment of the disclosure.

Further as shown in FIG. 24, when the applications are arranged on the different surfaces according to the second preset rule, and the different surfaces are parallel to one another in the left-right direction, the position on which the mobile terminal is located before moving, namely the position of the application C, is set to be the original position of the mobile terminal, and the user can only move the mobile terminal leftward or rightward based on arrow directions in the figure to launch the target application, wherein if the mobile terminal moves in the direction of an arrow 1, the corresponding moving direction is rightward, and correspondingly, if the mobile terminal moves in the direction of an arrow 2, the corresponding moving direction is leftward movement.

Figure 25:
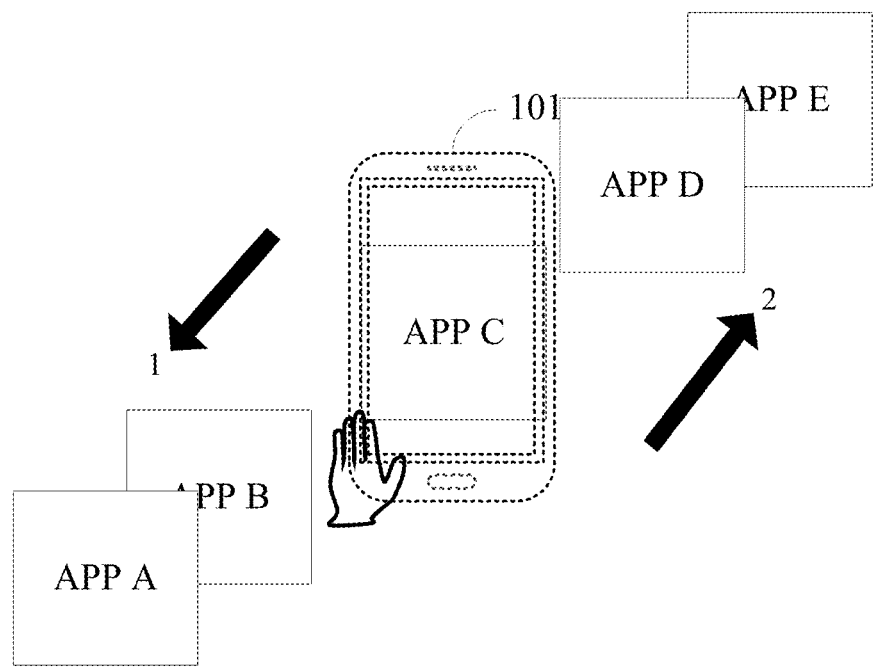
FIG. 25 is a forth schematic diagram illustrating a moving direction of a mobile terminal according to an embodiment of the disclosure.

Further as shown in FIG. 25, when the applications are arranged on the different surfaces according to the second preset rule, and the different surfaces are parallel to one another in the front-back direction, the position on which the mobile terminal is located before moving, namely the position of the application C, is set to be the original position of the mobile terminal, and the user can move the mobile terminal forward or backward only based on arrow directions in the figure to launch the target application, wherein if the mobile terminal moves in the direction of an arrow 1, the corresponding moving direction is forward, and correspondingly, if the mobile terminal moves in the direction of an arrow 2, the corresponding moving direction is backward movement.

Further as shown in FIG. 26, when the applications are arranged in the stereoscopic space according to the third preset rule, the position on which the mobile terminal is located before moving, namely the center position of the cube, is set to be the original position of the mobile terminal, and the user can move the mobile terminal around based on arrow directions in the figure to launch the target application, wherein if the mobile terminal moves in the direction of an arrow 1, the corresponding moving direction is upward; correspondingly, if the mobile terminal moves in the direction of an arrow 2, the corresponding moving direction is downward; if the mobile terminal moves in the direction of an arrow 3, the corresponding moving direction is rightward; if the mobile terminal moves in the direction of an arrow 4, the corresponding moving direction is leftward; if the mobile terminal moves in the direction of an arrow 5, the corresponding moving direction is forward; and if the mobile terminal moves in the direction of an arrow 6, the corresponding moving direction is backward movement.

In some possible embodiments of the disclosure, the first moving direction in the step A is acquired via at least one of an acceleration sensor, a gyroscope sensor and a camera sensor arranged on the mobile terminal.

In the embodiments, the moving direction of the mobile terminal can be acquired by using at least one of the acceleration sensor, the gyroscope sensor and the camera sensor arranged on the mobile terminal.

In some possible embodiments of the disclosure, the first moving distance in the step A can be determined according to the following steps:

a moving speed of the mobile terminal can be acquired via the acceleration sensor and a timer arranged on the mobile terminal, and integration is performed on the moving speed to acquire the first moving distance; and in practical application, the first acceleration at which the mobile terminal moves can be acquired according to the acceleration sensor arranged on the mobile terminal, meanwhile, first time of movement of the mobile terminal can be acquired according to the timer arranged on the mobile terminal, then, a first speed of movement of the mobile terminal can be acquired according to the first acceleration and the first time, and finally, integration is performed on the first speed in a first time zone, and thus the first moving distance in the step A can be acquired;

or when the mobile terminal moves in the first moving direction, the position change of feature points between each two adjacent frames in a video capturing ambient images surrounding the mobile terminal shot by a camera sensor arranged on the mobile terminal can be used for determining a moving distance of the mobile terminal between each two adjacent frames, and then moving displacement of the mobile terminal between each two adjacent frames can be accumulated to acquire the first moving distance. For example, if the mobile terminal takes 3 seconds to move in the first moving direction, the camera shoots a 3-second video which is composed of images shot according to the frequency of 30 frames per second, so that the video includes 90 frames in total, and a moving distance of the mobile terminal between each two adjacent frames is determined according to the position change of the feature points in the adjacent frames. Therefore, the first moving distance of the mobile terminal during a shooting process of the 3-second video can be acquired by accumulating all the moving distances.

It should be noted that in the step A, the mobile terminal can determine an acquisition mode of the first moving distance according to the first acceleration acquired by the acceleration sensor. For example, when the first acceleration is less than or equal to a preset acceleration threshold, the first moving distance can be determined by using the ambient images surrounding the mobile terminal shot by the camera sensor; and correspondingly, when the first acceleration is more than the preset acceleration threshold, the first moving distance can be determined by using the timer and the acceleration sensor.

It can be understood that the mode of determining the first moving distance through the timer and the acceleration sensor is more suitable for scenes where the mobile terminal moves slowly and stably. And the mode of determining the first moving distance by using the ambient images surrounding the mobile terminal shot by the camera sensor is suitable for scenes where the mobile terminal moves rapidly.

After determining the target application from the applications according to the current position of the mobile terminal, S203 can be executed.

S203: when a moving operation of the user on the mobile terminal is detected, a distance between the mobile terminal and the target application is shortened according to the moving operation, and a first distance between the current position of the mobile terminal and the preset initial position associated with the target application is determined.

In practical application, after the target application is determined through the S202, the user further moves the mobile device towards the position of the target application, and when the moving operation of the user on the mobile terminal is detected, if it is detected that the user moves the mobile terminal rightwards, the distance between the mobile terminal and the target application on the right side can be shortened according to the moving operation, and then the first distance between the current position of the mobile terminal and the preset initial position associated with the target application can be determined in real time, that is, the first distance refers to the distance between the current position of the mobile terminal and the target application.

In some possible embodiments of the disclosure, the implementation process of the S203 comprises the following steps.

Step C: the movement of the mobile terminal is detected that moves from the current position.

In practical application, after determining the target application, the moving operation implemented by the user on the mobile terminal for launching the target application can be further detected, and thus the mobile terminal can be close to the target application.

step D: a second moving direction and a second moving distance of the mobile terminal that moves from the current position can be acquired in response to detecting the movement of the mobile terminal.

In practical application, when a movement the mobile terminal is detected through the step C, the second moving direction and the second moving distance of the mobile terminal that moves towards the position of the target application based on the current position can be acquired by using at least one of the acceleration sensor, the gyroscope sensor and the camera sensor arranged on the mobile terminal, wherein the determination mode of the second moving direction is accordant with that of the first moving direction in the step A, and related parts can be seen from introduction of the determination mode of the first moving direction in the step A and are not repeated herein; and similarly, the determination mode of the second moving distance is also similar to that of the first moving distance in the above step A, and related parts can be seen from introduction related to the determination mode of the first moving direction in the step A, that is, second acceleration of movement of the mobile terminal can be acquired according to the acceleration sensor arranged on the mobile terminal, meanwhile, second time of movement of the mobile terminal can be acquired according to the timer arranged on the mobile terminal, a second speed of movement of the mobile terminal can then be acquired according to the second acceleration and the second time, and finally, integration is performed on the second speed in a second time zone, and thus the second moving distance in the step D can be acquired; or when the mobile terminal moves in the second moving direction, the position change of feature points between each two adjacent frames in ambient images surrounding the mobile terminal shot by a camera sensor arranged on the mobile terminal can be used for determining a moving distance of the mobile terminal between each two adjacent frames, and then the moving distances of the mobile terminal between the adjacent frames can be accumulated to acquire the second moving distance in the step D.

Step E: the first distance between the current position of the mobile terminal and the preset initial position associated with the target application is determined according to the current position of the mobile terminal, the position of the target application, the second moving direction and the second moving distance.

In practical application, after acquiring the current position of the mobile terminal, the position of the target application, the second moving direction and the second moving distance through the step D, a distance value between the current position of the mobile terminal and the target application can be determined to serve as the first distance.

After acquiring the first distance between the current position of the mobile terminal and the preset initial position associated with the target application, S204 can be executed.

S204: when the first distance is less than a predetermined threshold, the target application is launched.

In practical application, a user can preset a distance threshold between the mobile terminal and the target application on the mobile terminal to determine whether to launch the target application or not, and when it is determined that the distance between the mobile terminal and the target application is less than the threshold, the target application can be launched and displayed on the mobile terminal; when it is determined that the distance between the mobile terminal and the target application is not less than the threshold, that is, a first distance value does not reach a predetermined threshold, the target application cannot be launched. For example, the threshold can be set to be 1 cm, and when it is determined that the distance between the mobile terminal and the target application is less than 1 cm, the target application can be launched, and correspondingly, when it is determined that the distance between the mobile terminal and the target application is not less than 1 cm, that is, the first distance value does not reach the predetermined threshold, the target application cannot be launched.

In this way, in the method for launching an application provided by the disclosure, the mobile terminal presets the initial positions for applications, wherein the initial positions associated with applications are located outside a screen display of the mobile terminal; then the target application can be determined from the applications according to the current position of the mobile terminal; then after detecting a moving operation of the user on the mobile terminal, a distance between the mobile terminal and the target application is shortened according to the moving operation, and then the first distance between the current position of the mobile terminal and the preset initial position associated with the target application is determined; and furthermore, the target application can be launched when the first distance is less than the predetermined threshold. It can be seen that by means of the disclosure, in the manner of shortening the distance between the mobile terminal and the target application by moving the mobile terminal according to the will of the user, the target application can be conveniently launched when the distance is less than the predetermined threshold, and thus the user experience is upgraded.

Based on the above method for launching an application, the disclosure also provides a device for launching an application, which is applied to a mobile terminal and comprises:

an initial position setting module 1401 configured to preset an initial position for an application, wherein the initial position associated with an application is located outside a screen display of the mobile terminal;

a current position determination module 1402 configured to determine a target application from the applications according to a current position of the mobile terminal;

a first distance determination module 1403 configured to shorten a distance between the mobile terminal and the target application, when a movement of the mobile terminal is detected, according to the moving operation, and to determine a first distance between the current position of the mobile terminal and the preset initial position associated with the target application; and an application launching module 1404 configured to launch the target application when the first distance is less than a predetermined threshold.

Optionally, the initial position setting module 1401 is configured to:

arrange the applications on a same surface according to a first preset rule; or, arrange the applications on different surfaces according to a second preset rule, wherein the different surfaces are parallel to one another; or, arrange the applications in a preset stereoscopic space according to a third preset rule.

Optionally, the current position determination module 1402 comprises:

a first acquisition sub-module configured to acquire a first moving direction and a first moving distance of the mobile terminal which moves based on an original position, wherein the original position is a position at which the mobile terminal is located before moving; and a current position determination sub-module configured to determine the current position of the mobile terminal current position of the mobile terminal the first moving direction and the first moving distance.

Optionally, the first distance determination module 1403 comprises:

a detection sub-module configured to detect a movement of the mobile terminal that moves from the current position;

a second acquisition sub-module configured to acquire a second moving direction and a second moving distance of the mobile terminal that moves from the current position in response to detecting the movement of the mobile terminal; and a first distance determination sub-module configured to determine the first distance between the current position of the mobile terminal and the preset initial position associated with the target application according to the current position of the mobile terminal, the initial position associated with the target application, the second moving direction and the second moving distance.

Optionally, the first moving direction and the second moving direction are acquired through at least one of an acceleration sensor, a gyroscope sensor and a camera sensor arranged on the mobile terminal.

Optionally, the first moving direction and the second moving direction are respectively at least one of upward, downward, leftward, rightward, forward and backward.

Optionally, the device also comprises:

a moving distance acquisition module configured to acquire a moving speed of the mobile terminal via the acceleration sensor and a timer arranged on the mobile terminal, and to integrate the moving speed to acquire the first moving distance and the second moving distance; or acquire a video ambient image via a camera arranged on the mobile terminal, wherein the video captures ambient images surrounding the mobile terminal, the video comprises a plurality of frames; acquire a plurality of moving displacements of the mobile terminal according to each two adjacent frames, and add the plurality of moving displacements together to acquire the first moving distance and the second moving distance.

In this way, in the device for launching an application provided by the disclosure, the mobile terminal presets the initial positions for applications, wherein the initial positions associated with application are located outside a screen display of the mobile terminal; then the target application can be determined from the applications according to the current position of the mobile terminal; then after detecting a moving operation of the user on the mobile terminal, the distance between the mobile terminal and the target application is shortened according to the moving operation, and then the first distance between the current position of the mobile terminal and the preset initial position associated with the target application is determined; and furthermore, the target application can be launched when the first distance is less than the predetermined threshold. It can be seen that by means of the disclosure, in the manner of shortening the distance between the mobile terminal and the target application by moving the mobile terminal according to the will of the user, the target application can be conveniently launched when the distance is less than the predetermined threshold, and thus the user experience is upgraded.

Figure 28:
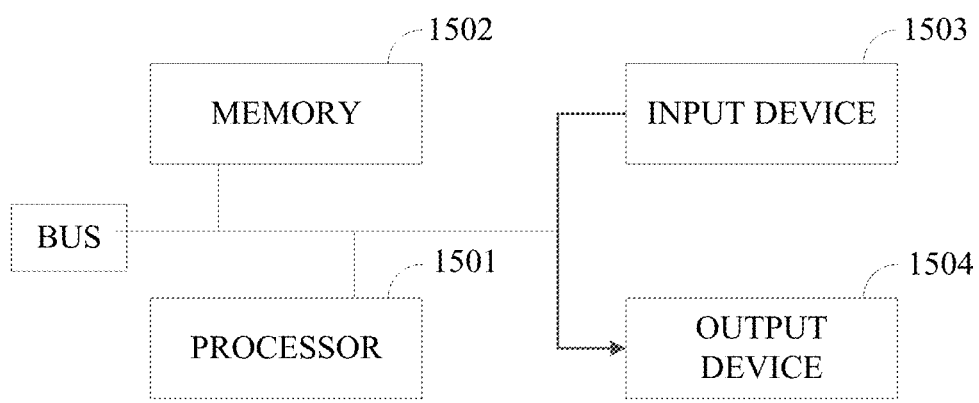
FIG. 28 is a block flow diagram of an equipment for launching an application according to an embodiment of the disclosure.

Correspondingly, an embodiment of the present disclosure also provides an application startup device, as shown in FIG. 28, which may include:

the processor 1501, the memory 1502, the input device 1503, and the output device 1504. The number of processors 1501 in the device for launching an application may be one or more, and one processor is used as an example in FIG. 15. In some embodiments of the disclosure, the processor 1501, the memory 1502, the input device 1503, and the output device 1504 may be connected through a bus or in other ways. In FIG. 15, connection through a bus is used as an example.

The memory 1502 may be used to store software programs and modules. The processor 1501 runs the software programs and modules stored in the memory 1502 to execute application programs to start various functional applications and data processing of the device. The memory 1502 may mainly include a storage program area and a storage data area, and the storage program area may store an operating system, application programs required for at least one function, and the like. In addition, the memory 1502 may include a high-speed random access memory, and may also include a non-volatile memory, such as at least one magnetic disk storage device, a flash memory device, or other volatile solid-state storage devices. The input device 1503 can be used to receive input numeric or character information, and generate signal input related to user settings and function control of the device for launching an application.

Specifically, in some embodiments, the processor 1501 loads the executable file corresponding to the process of one or more application programs into the memory 1502 according to the instructions, and the processor 1501 runs the application program stored in the memory 1502, so as to realize various functions in the above methods for launching an application.

Figure 31:
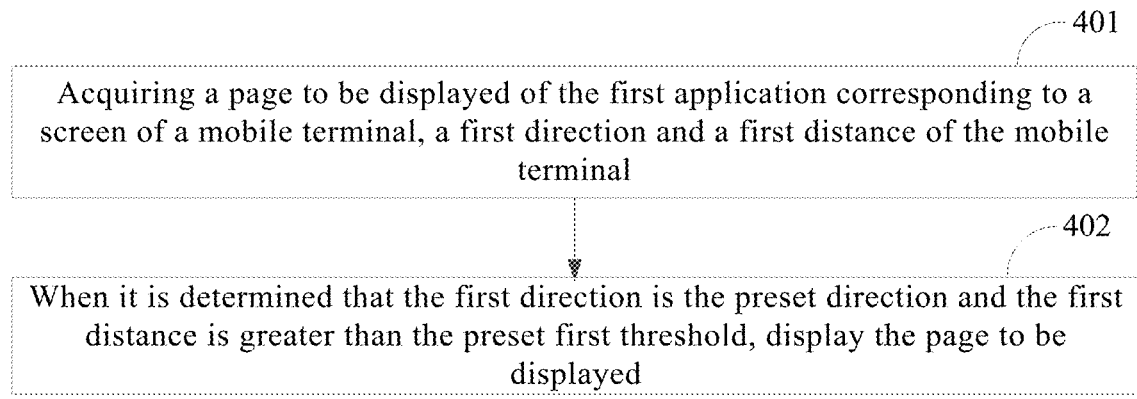
FIG. 31 is a flow chart of the application page display method according to an embodiment of the disclosure.

In some embodiments, an application page display method and mobile terminal are also disclosed. As shown in FIG. 31, the method includes:

S401: acquiring a page to be displayed of the first application corresponding to a screen of a mobile terminal, a first direction and a first displacement of the mobile terminal.

The page to be displayed refers to the application page that the mobile terminal needs to display according to the needs of the user. In this embodiment, the first application is described as an example of the application to which the page to be displayed belongs.

Figure 32:
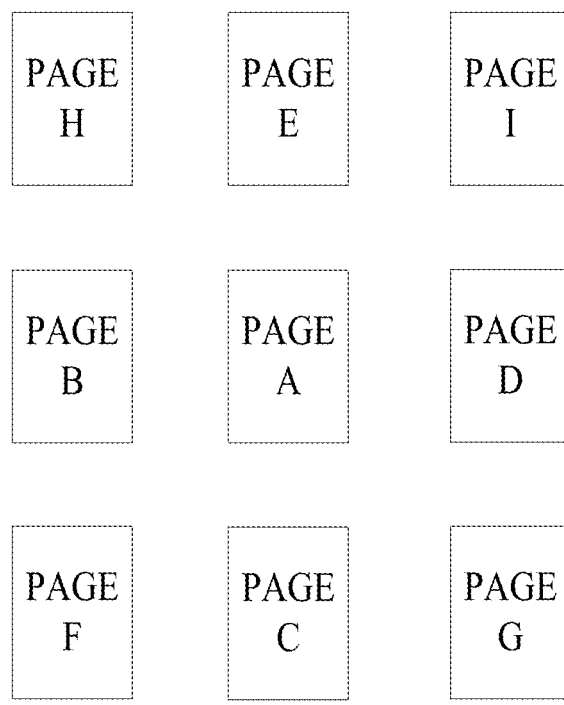
FIG. 32 is a layout diagram of pages of the first application according to an embodiment of the disclosure.

In this embodiment, one or more pages of the first application may be arranged on a surface parallel to a screen of a mobile terminal according to a preset arrangement. FIG. 32 is a schematic diagram of arrangement of the pages of a first application provided by an embodiment of the disclosure. As shown in the exemplary arrangement shown in FIG. 33, page A is arranged on a surface, and page B, page C, page D, and page E are arranged on the left, right, bottom, right, and top of page A on the surface; pages F and G are arranged on the left and right of page C; and pages H and I are arranged on the left and right of page E.

When a mobile terminal displays pages in full screen, it can only display one page at a time. Therefore, before the mobile terminal displays the page to be displayed, in order to avoid incorrect display of pages other than the page to be displayed of the first application, first of all, the page to be displayed needs to be determined from the pages of the first application. See FIGS. 33 to 35 below, which specifically illustrate the scenarios of three mobile terminal screens corresponding to the page to be displayed.

Figure 33:
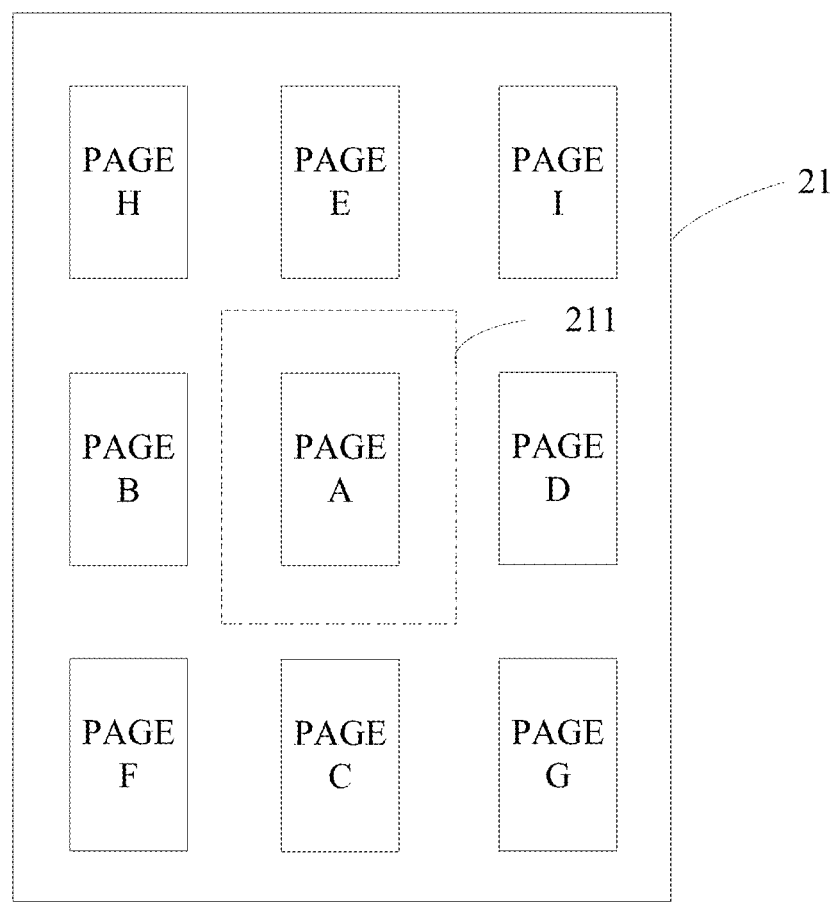
FIG. 33 is a scenario diagram of a screen of the mobile terminal corresponding to a page to be displayed according to an embodiment of the disclosure.

In the scenario shown in FIG. 33, the mobile terminal screen 21 contains a preset area 211 for determining the corresponding page. The preset area 211 contains at most one first application page at a time, and the mobile terminal screen 21 may also contain Complete pages of multiple first apps. When the preset area 211 contains a page of the first application, the mobile terminal uses the page as the page corresponding to the screen 21 of the mobile terminal, that is, the page to be displayed. According to the scenario illustrated in FIG. 33, page A is included in the preset area 211, so the page to be displayed corresponding to the first application of the mobile terminal screen 21 is page A.

Figure 34:
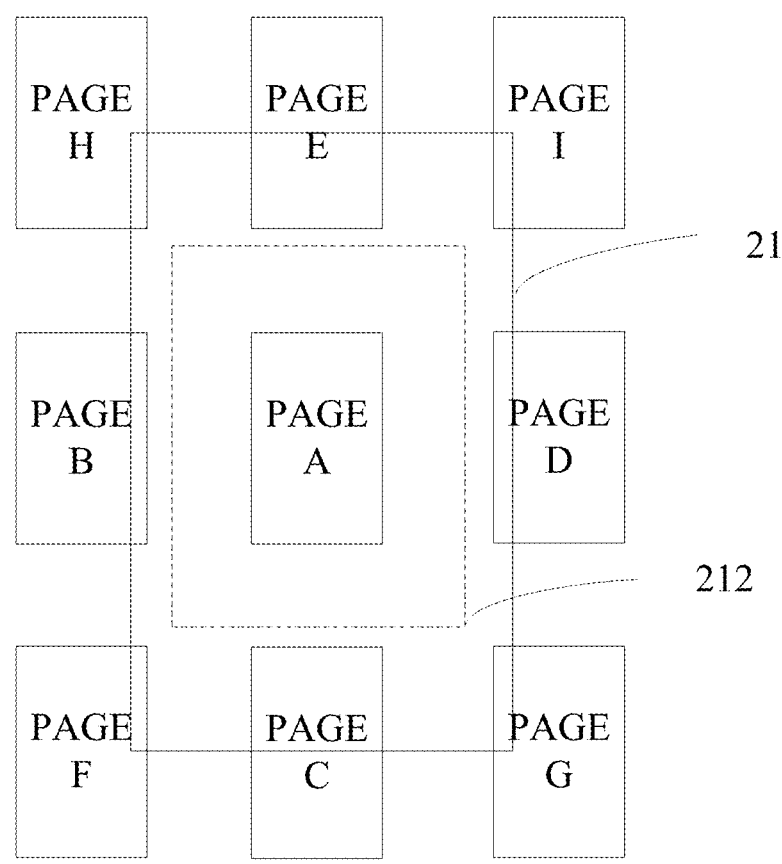
FIG. 34 is a scenario diagram of another screen of the mobile terminal corresponding to a page to be displayed according to an embodiment of the disclosure.

The scenario shown in FIG. 34 is similar to that in FIG. 33. The mobile terminal screen 21 includes a preset area 212 for determining the corresponding page. The preset area 212 contains at most one first application page at a time, and the mobile terminal screen 21 can only contain one complete page of the first application at the same time. When the preset area 212 contains a page of the first application, the mobile terminal determines the page as the page corresponding to the screen 212 of the mobile terminal, that is, the page to be displayed. According to the scenario illustrated in FIG. 34, page A is included in the preset area 212, so the page to be displayed corresponding to the first application of the mobile terminal screen 21 is page A.

Figure 35:
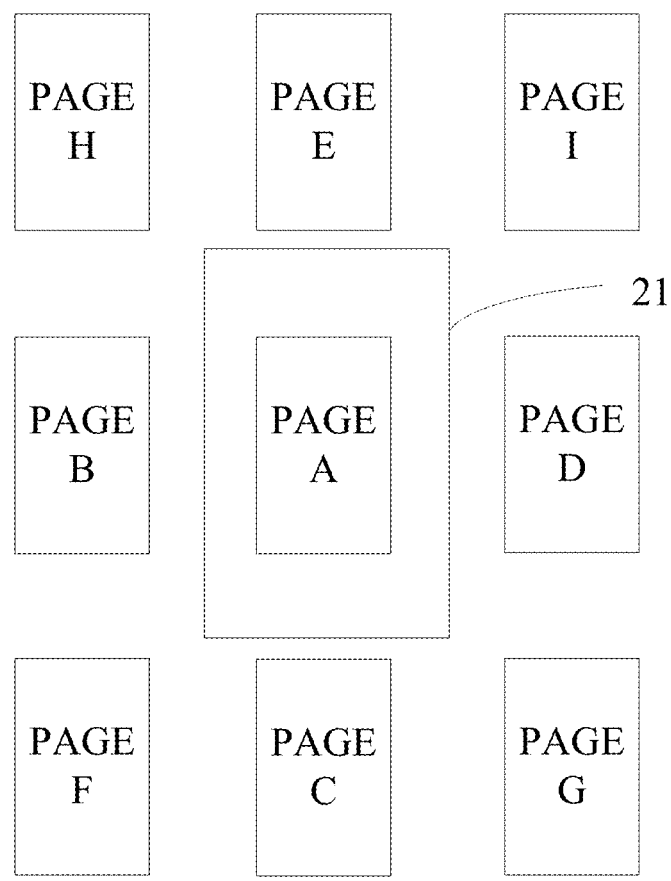
FIG. 35 is a scenario diagram of other screen of the mobile terminal corresponding to a page to be displayed according to an embodiment of the disclosure.

In the scenario shown in FIG. 35, the mobile terminal screen 21 contains at most one complete page of the first application at a time, and the mobile terminal determines the only complete page included in the mobile terminal screen 21 as the page corresponding to the mobile terminal screen 21, that is, the page to be displayed. According to the scenario exemplified in FIG. 35, page A is included in the screen 21 of the mobile terminal, so the page to be displayed corresponding to the first application of the screen 21 of the mobile terminal is page A.

It can be understood that, in the foregoing scenario example, the shapes of the preset area 211 and the preset area 212 may be rectangular, circular, oval, etc., and the shape of the preset area is not specifically limited. The center of gravity positions of the preset area 211 and the preset area 212 may be as shown in FIG. 33 and FIG. 34, respectively, and may or may not coincide with the center of gravity position of the mobile terminal screen 21, for example, the preset area 211 or the preset area 212 is located above, below, left or right in the screen 21 of the mobile terminal.

It can be understood that when the user selects a page to be displayed from the pages of the first application, the screen of the mobile terminal may correspond to a page that does not currently need to be displayed multiple times. To prevent the mobile terminal from displaying pages that do not currently need to be displayed, the mobile terminal also needs to determine the user's selection through additional user operations. Furthermore, in the method for displaying an application page provided in this embodiment, after acquiring the page to be displayed corresponding to the screen of the mobile terminal, the first direction and the first displacement of the mobile terminal moving need to be acquired.

In this embodiment, the first direction is specifically the direction in which the mobile terminal moves after acquiring the page to be displayed corresponding to the mobile terminal screen; the first displacement is the distance that the mobile terminal moves in the first direction after acquiring the page to be displayed corresponding to the mobile terminal screen.

S402: When it is determined that the first direction is the preset direction and the first displacement is greater than a predetermined first threshold, display the page to be displayed.

The predetermined first threshold is a preset distance limit used to trigger the mobile terminal to display the page to be displayed. In this step, the consistency between the first direction and the preset direction, and the relationship between the first displacement and the predetermined first threshold are two deciding factors that determine whether the mobile terminal can display the page to be displayed.

Only when the mobile terminal determines that the first direction is the preset direction and the first displacement is greater than the predetermined first threshold, the mobile terminal displays the page to be displayed.

In this embodiment, the preset direction is a direction perpendicular to the screen of the mobile terminal. The preset direction may be the back orientation of the mobile terminal screen or the front orientation of the mobile terminal screen. It should be noted that when the preset direction is used to determine the first direction in which the mobile terminal moves, the preset direction is unique.

In one embodiment, if the preset direction is the back orientation of the mobile terminal screen, when the mobile terminal determines that the first direction is the back orientation of the mobile terminal screen, and the first displacement is greater than the predetermined first threshold, the page to be displayed is displayed. In yet another embodiment, if the preset direction is the front orientation of the mobile terminal screen, when the mobile terminal determines that the first direction is the front orientation of the mobile terminal screen, and the first displacement is greater than the predetermined first threshold, the page to be displayed is displayed.

The above is the method for displaying page of application provided by the embodiment of the disclosure. First, the mobile terminal acquires a page to be displayed of the first application corresponding to the screen, as well as the first direction and first displacement of the mobile terminal; when the first direction is determined to be the preset direction and the first displacement is greater than the predetermined first threshold, the page to be displayed is displayed. Therefore, in this method, whether the application page is displayed or not depends on whether the mobile terminal's moving direction and distance satisfy the requirements, and whether the screen corresponds to page to be displayed of the application. This method does not require users to touch specific buttons on the screen or perform page switching gestures. Therefore, it reduces the dependence of page display on user manual touch operation, improves the convenience of page display, and effectively upgrades the user experience.

In practical applications, mobile terminals often face the need to switch from the current page of the first application displayed at the current moment to another page of the first application that needs to be displayed at the next moment. Therefore, based on the application page display method provided by the foregoing embodiment, another embodiment of the application page display method is provided in the embodiments of the disclosure, detailing how to implement page switching display.

Figure 36:
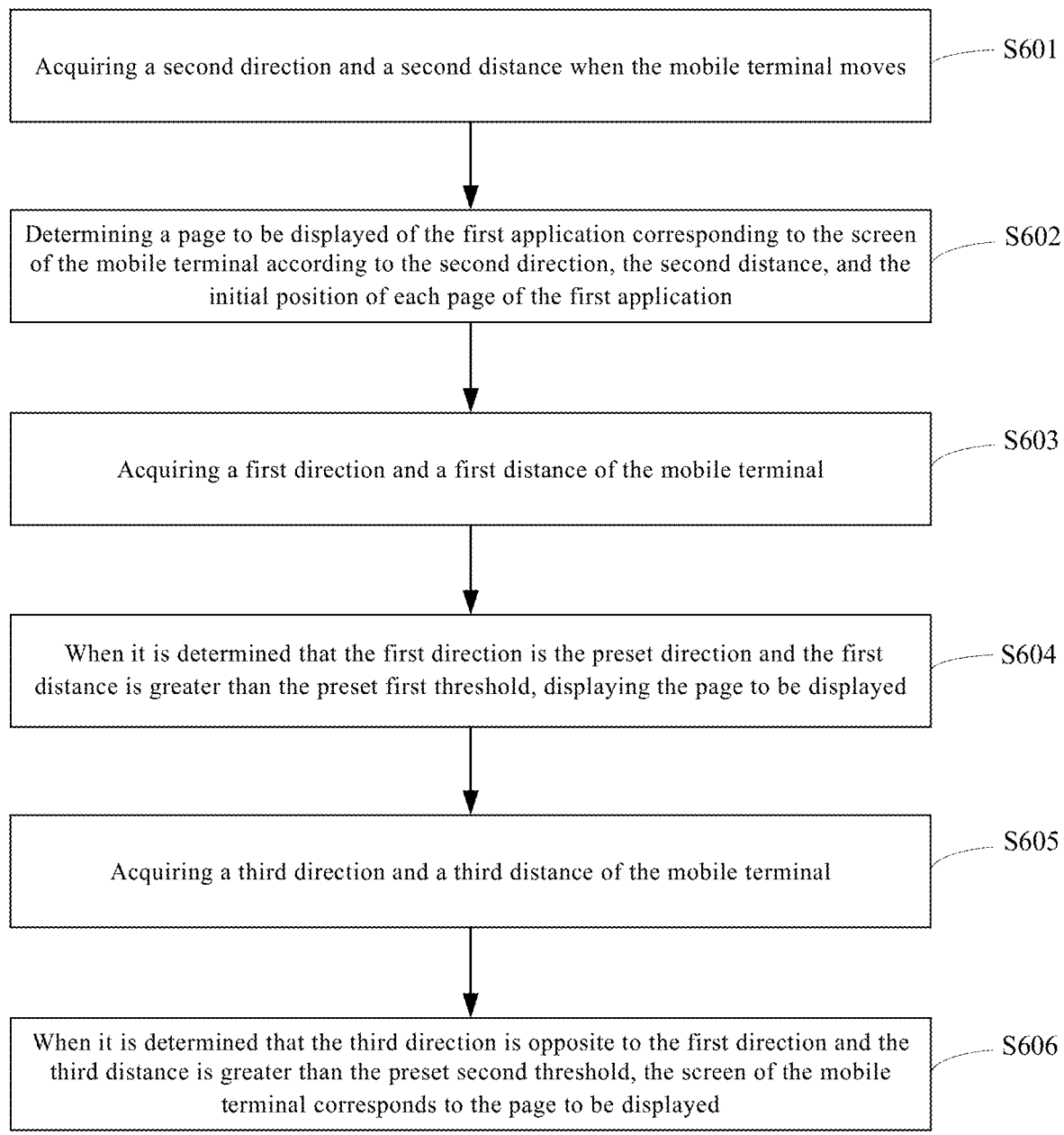
FIG. 36 is flow chart of a method for displaying the application page according to an embodiment of the disclosure.

Referring to FIG. 36, FIG. 36 is a flowchart of method for displaying page of an application provided by this embodiment.

The method for displaying page of an application provided by this embodiment comprises:

S601: acquiring a second direction and a second displacement when the mobile terminal moves in the second direction for the second displacement.

In this embodiment, after the mobile terminal is moved by the second displacement in the second direction, the page of first the application corresponding to the screen of the mobile terminal may be determined as the page to be displayed of the first application. Therefore, in this step, in order to correctly acquire the page to be displayed of the first application, the mobile terminal first acquires the second direction and the second displacement when it actually moves.

The second direction is parallel to the screen of the mobile terminal, and includes at least one of upward movement, downward movement, leftward movement, and rightward movement. The acceleration sensor provided on the mobile terminal can acquire the movement direction of the mobile terminal. The gyro sensor can be used to locate and orient the moving mobile terminal. The image acquired by the camera sensor can be used to determine moving direction of the mobile terminal according to the change of position of the feature point. Therefore, the second direction of the mobile terminal can be acquired by one or more of an acceleration sensor, a gyro sensor, and a camera sensor. The second direction acquired by using multiple sensors has higher accuracy.

Referring to FIG. 37 to FIG. 40, schematic diagrams of the mobile terminal moving in four different directions are illustrated respectively. In FIGS. 37 to 40, the scene of the mobile terminal screen shown in FIG. 35 corresponding to the page to be displayed is used as a reference of movement. In the scenario shown in FIG. 35, the mobile terminal screen 21 corresponds to page A of the first application.

Figure 37:
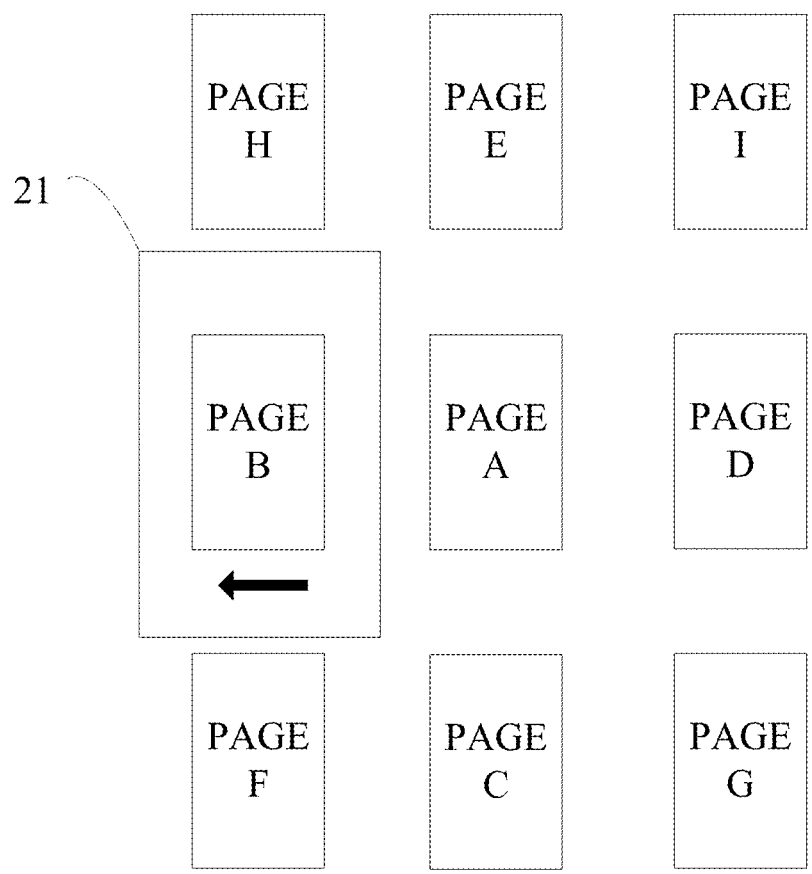
FIG. 37 is a schematic diagram of a mobile terminal moving leftward according to an embodiment of the disclosure.

As shown in FIG. 37, after the mobile terminal moves a second displacement in a leftward direction parallel to the mobile terminal screen 21, the page B of the first application is corresponding to the mobile terminal screen 21. Therefore, after movement, the page to be displayed of the first application corresponding to the screen 21 of the mobile terminal is page B.

Figure 38:
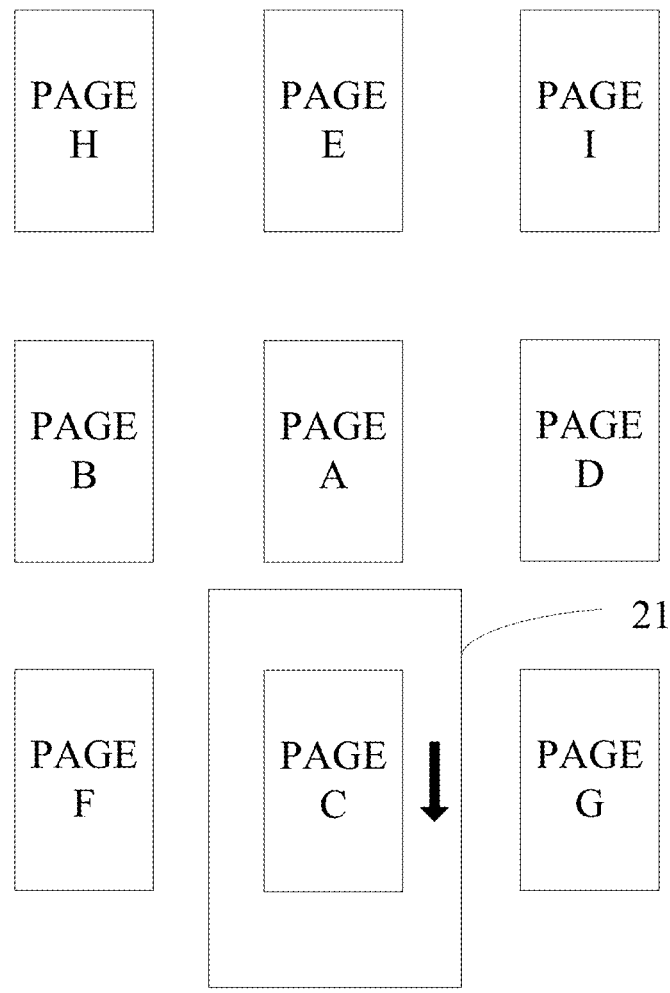
FIG. 38 is a schematic diagram of a mobile terminal moving downward according to an embodiment of the disclosure.

As shown in FIG. 38, after the mobile terminal moves a second displacement in a downward direction parallel to the mobile terminal screen 21, the page C of the first application is corresponding to the mobile terminal screen 21. Therefore, after movement, the page to be displayed of the first application corresponding to the screen 21 of the mobile terminal is page C.

Figure 39:
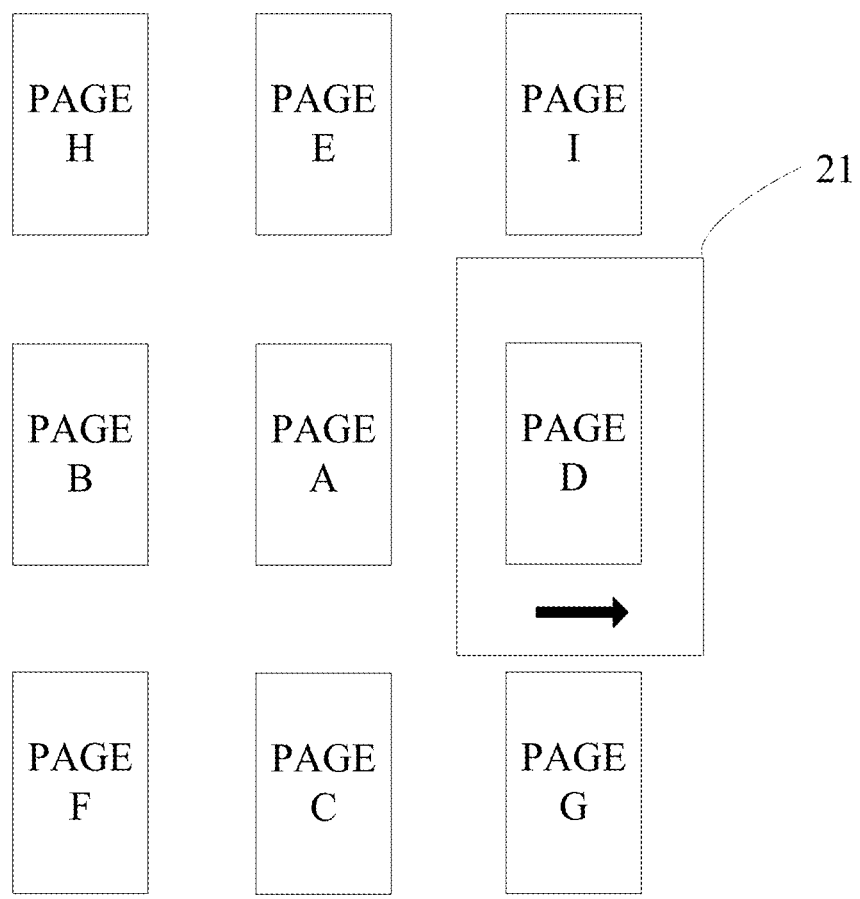
FIG. 39 is a schematic diagram of a mobile terminal moving rightward according to an embodiment of the disclosure.

As shown in FIG. 39, after the mobile terminal moves a second displacement in a rightward direction parallel to the mobile terminal screen 21, the page D of the first application is corresponding to the mobile terminal screen 21. Therefore, after movement, the page to be displayed of the first application corresponding to the screen 21 of the mobile terminal is page D.

Figure 40:
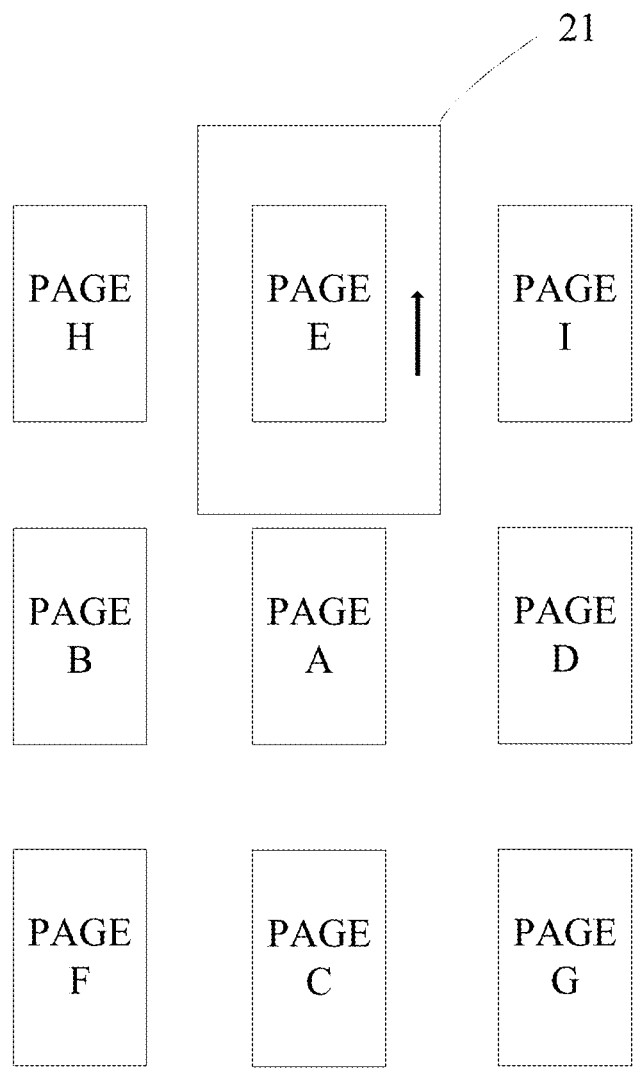
FIG. 40 is a schematic diagram of a mobile terminal moving upward according to an embodiment of the disclosure.

As shown in FIG. 40, after the mobile terminal moves a second displacement in an upward direction parallel to the mobile terminal screen 21, the page E of the first application is corresponding to the mobile terminal screen 21. Therefore, after movement, the page to be displayed of the first application corresponding to the screen 21 of the mobile terminal is page E.

It should be noted that the mobile terminal may move once or multiple times to reach the target position when moving, and each movement is performed according to any one of the second directions shown in FIG. 37 to FIG. 40. If the mobile terminal is moved into position multiple times, the second direction of each movement may be the same or different. If the mobile terminal reaches the target position by moving multiple times, the acquired second displacement is also the second displacement corresponding to the second direction for the second direction of each movement.

In this embodiment, when the mobile terminal moves in the second direction, the acceleration acquired by the acceleration sensor is used as the second acceleration. The mobile terminal may specifically select the acquisition method of the second displacement according to the magnitude of the second acceleration acquired by the acceleration sensor. The following provides two ways to determine the second displacement acquisition method according to the magnitude of acceleration.

In some embodiments, when the second acceleration of the mobile terminal is less than or equal to the predetermined acceleration threshold, the mobile terminal uses its own camera sensor to acquire second ambient images surrounding the mobile terminal, wherein the second ambient images comprises a plurality of frames, and the plurality frames comprise feature points; then, according to the change of the position of the feature point between each two adjacent frames of the second ambient images, determine a moving displacement of the mobile terminal between each two adjacent frames; finally, all the moving displacements s are added to acquire the second displacement. For easy understanding, the embodiment is illustrated by the following example. If the mobile terminal takes 2 seconds to move in the second moving direction, the camera shoots a 2-second video which is composed of images shot according to the frequency of 30 frames per second, so that the video includes 60 frames in total. And a moving displacement of the mobile terminal between each two adjacent frames is determined according to the position change of the feature point in the adjacent frames. Therefore, the second displacement of the mobile terminal during a shooting process of the 2-second video can be acquired by accumulating all the moving displacements.

In some embodiments, when the second acceleration of the mobile terminal is greater than a predetermined acceleration threshold, according to the timer, acquire a second time of movement of the mobile terminal; according to the second acceleration and the second time, acquire a second speed at which the mobile terminal moves; integrating the second speed in the interval of the second time to acquire the second displacement.

It should be noted that the first way to acquire the second displacement is more suitable for the scenario where the mobile terminal moves at a slower speed and is more stable. In this scenario, the second displacement acquired by image processing has high accuracy, which can be combined to correct the error in the second displacement acquired in the second way. The second way of acquiring the second displacement is more suitable for the scenario where the mobile terminal moves at a faster speed. In this scenario, the accuracy of acquiring the second displacement by calculating the acceleration and time and integrating the calculation result is high. The image captured by the camera sensor is likely to have insufficient clarity.

S602: Determining a page to be displayed of the first application corresponding to the screen of the mobile terminal according to the second direction, the second displacement, and the initial positions associated with the pages of the first application.

It should be noted that the initial position associated with the page of the first application refers to a position at which the page of the first application is arranged on a surface according to a preset arrangement. Specifically, the surface may be a surface parallel to the screen of the mobile terminal. According to the initial position associated with the page of the first application, the mobile terminal can acquire the relative position relationship of the page before the mobile terminal moves.

Figure 41:
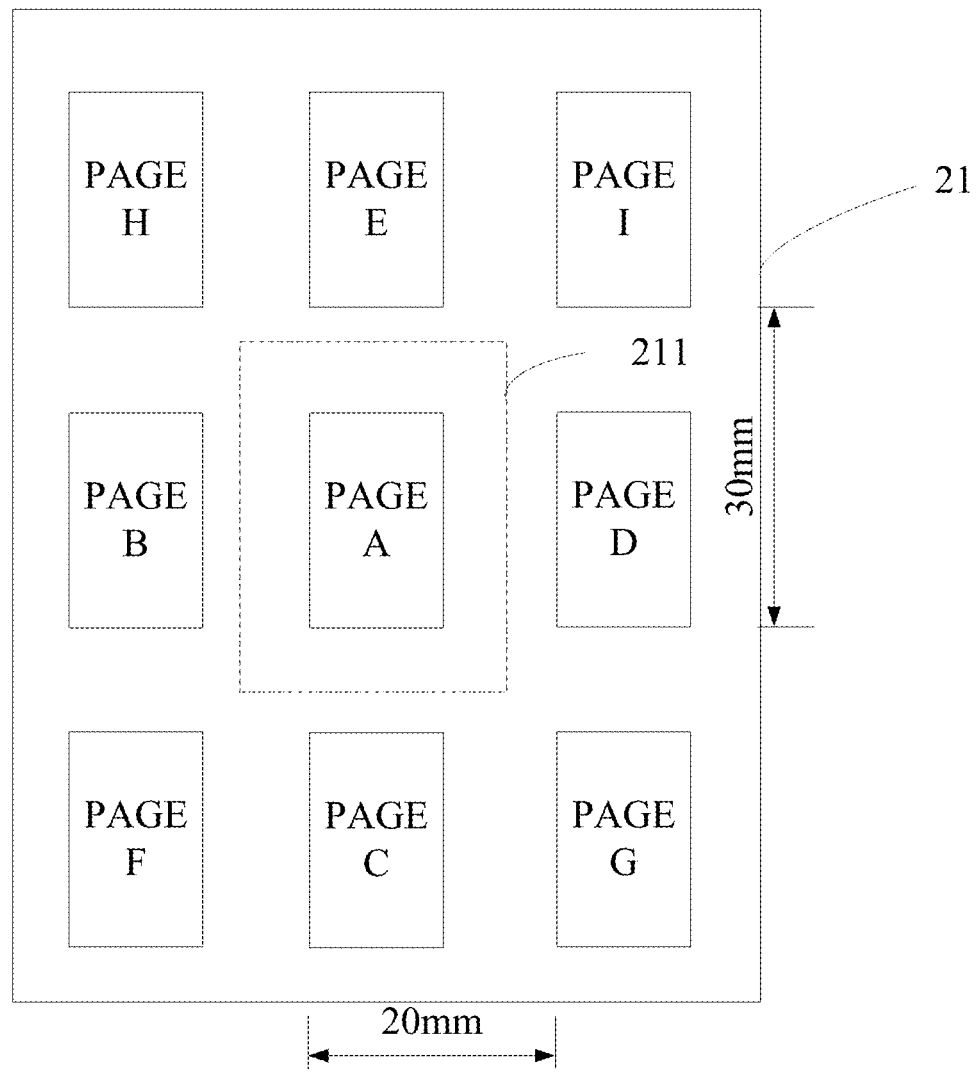
FIG. 41 is a layout diagram of pages of the first application according to an embodiment of the disclosure.

For ease of understanding, please refer to the arrangement diagram of pages of the first application shown in FIG. 41. As shown in the exemplary arrangement shown in FIG. 41, a page A is arranged on a surface parallel to the screen of the mobile terminal, and the page A is arranged in a preset area 211. The preset area 211 is used to determine the page corresponding to the screen of the mobile terminal, that is, the page A is arranged on the surface corresponding to the screen 21 of the mobile terminal. Page B, page C, page D, and page E are arranged on the left, bottom, right, and top of page A on the surface; page F and page G are arranged on the left and right of page C; and page H and page I are arranged on the left and right of page I. The horizontal distance of the page is 20 mm, and the vertical distance of page is 30 mm.

It should be noted that FIG. 41 is only an exemplary arrangement of the pages of the first application. Depending on the arrangement, the pages may have other initial positions and relative positional relationships. The arrangement of the pages on the surface is not limited herein.

According to the initial positions associated with the pages, the mobile terminal can acquire the relative positional relationship of pages, such as the relative direction and relative distance of the pages on the same surface, and the page corresponding to the screen of the mobile terminal. Therefore, the mobile terminal performs corresponding calculation according to the second direction and distance of the actual movement and the initial positions associated with pages acquired in S601, and can determine the page corresponding to the screen after the mobile terminal moves. It should be noted that the mobile terminal screen corresponds to only one page of the first application at a time which is the page to be displayed of the first application.

S603: acquiring a first direction and a first displacement of the mobile terminal when the mobile terminal moves in the first direction for the first displacement.

The first direction in which the mobile terminal moves is the direction in which the mobile terminal moves after acquiring the page to be displayed of the first application corresponding to the mobile terminal screen in S602. The first displacement is the distance that the mobile terminal moves in the first direction after acquiring the page to be displayed of the first application corresponding to the mobile terminal screen in S602.

The first direction of the mobile terminal can be acquired by one or more of an acceleration sensor, a gyro sensor, and a camera sensor. The first direction acquired by using multiple sensors has higher accuracy.

In this embodiment, when the mobile terminal moves in the first direction, the acceleration acquired by the acceleration sensor is used as the first acceleration. The mobile terminal may specifically select an acquisition method of the first displacement according to the magnitude of the first acceleration acquired by the acceleration sensor. The following provides two ways to determine the first displacement acquisition method according to the magnitude of acceleration.

In some embodiments, when the first acceleration of the mobile terminal is less than or equal to the predetermined acceleration threshold, the mobile terminal uses its own camera sensor to acquire a first environment image; then, according to the change of the position of the feature point between each adjacent two frames in the first environment image, determine the distance that the mobile terminal moves between each adjacent two frames; finally, the distances between all adjacent two frames is added to acquire the first displacement.

In some embodiments, when the first acceleration of the mobile terminal is greater than a predetermined acceleration threshold, according to the timer, acquire a first time of movement of the mobile terminal; according to the first acceleration and the first time, acquire a first speed at which the mobile terminal moves; integrating the first speed in the interval of the first time to acquire the first displacement.

It should be noted that the first way to acquire the second displacement is more suitable for the scenario where the mobile terminal moves at a slower speed and is more stable. In this scenario, the second displacement acquired by image processing has high accuracy, which can be combined to correct the error in the second displacement acquired in the second way. The second way of acquiring the second displacement is more suitable for the scenario where the mobile terminal moves at a faster speed. In this scenario, the accuracy of acquiring the second displacement by calculating the acceleration and time and integrating the calculation result is high. The image captured by the camera sensor is likely to have insufficient clarity.

S604: When it is determined that the first direction is the preset direction and the first displacement is greater than a predetermined first threshold, displaying the page to be displayed.

Step 604 in this embodiment is the same as step 102 in the foregoing embodiment. For the sake of brevity, no more detailed description is provided here. For details, please refer to the description in the foregoing embodiment.

To facilitate understanding of the above implementation processes of S601 to S604, specific examples are described below with reference to FIGS. 41 to 44.

Figure 42:
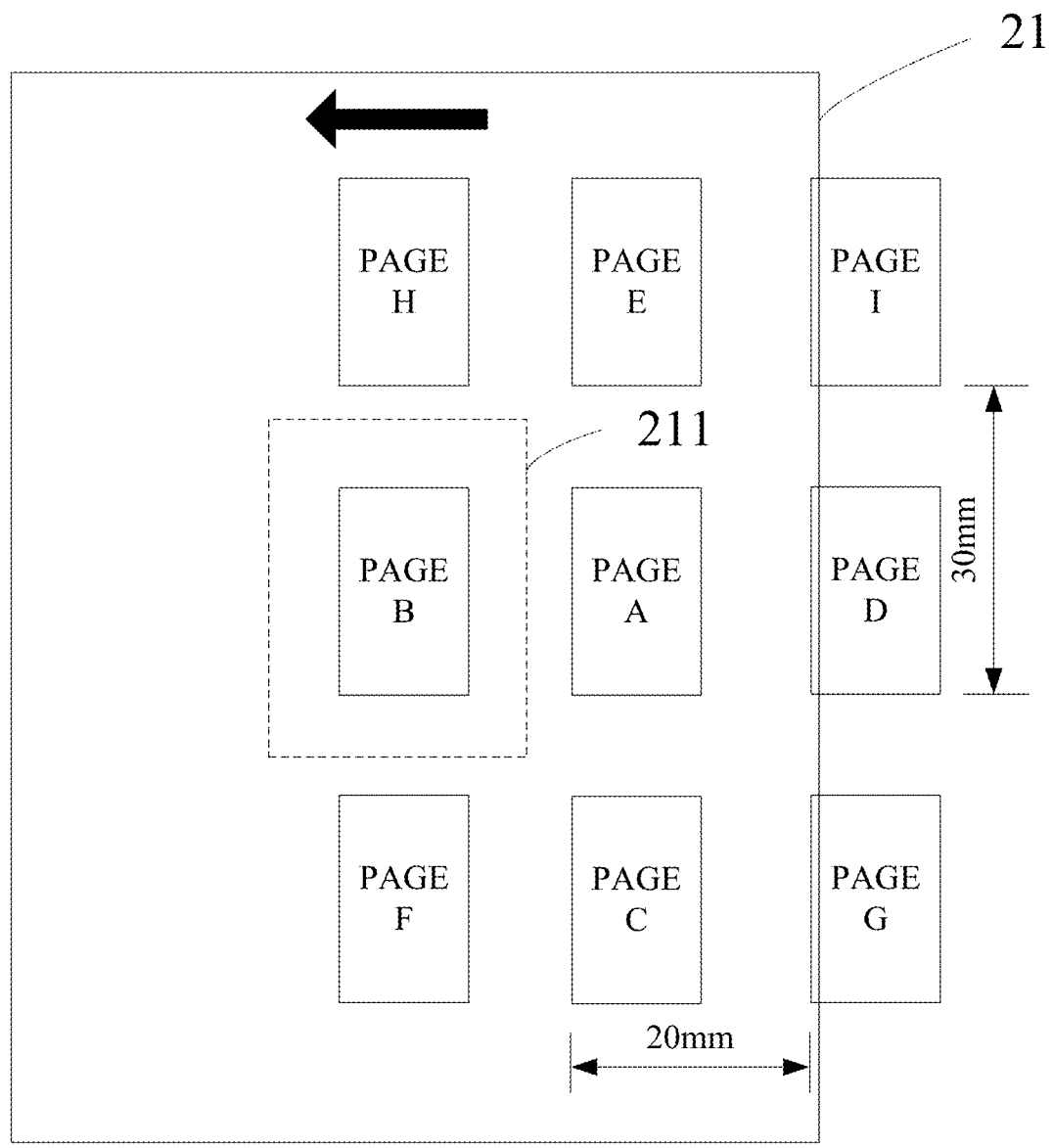
FIG. 42 is a schematic diagram of a mobile terminal moving 20 mm to the left according to an embodiment of the disclosure.
Figure 43:
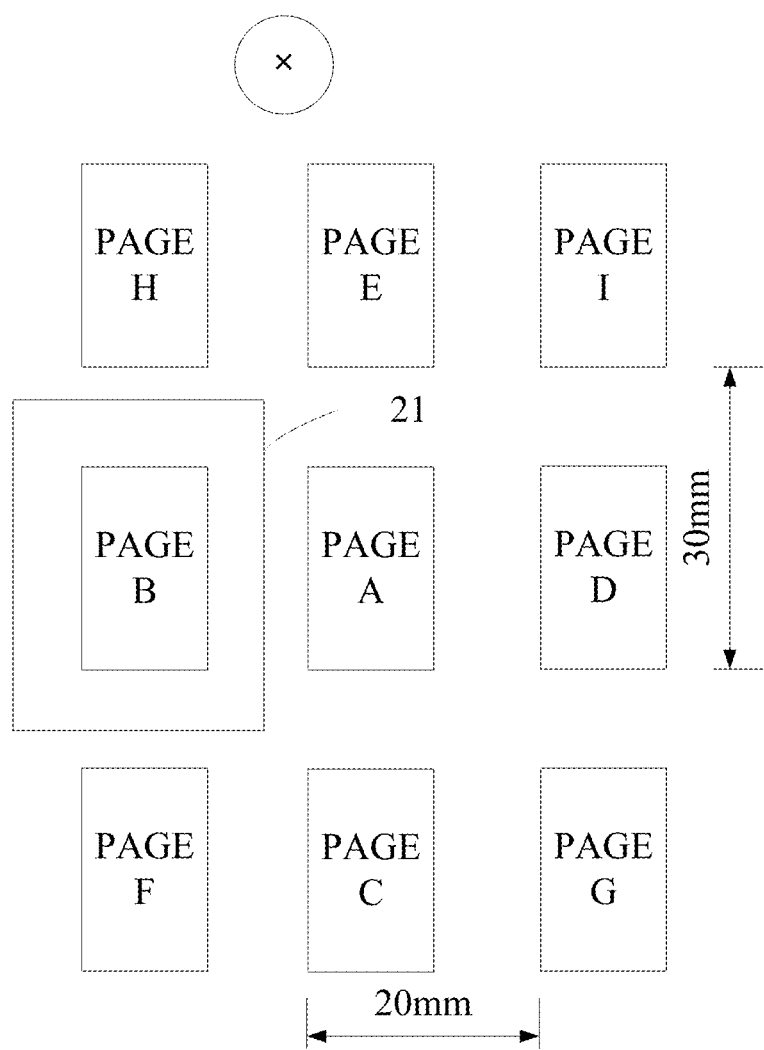
FIG. 43 is a schematic diagram of the mobile terminal moving in a direction toward the back of the screen of the mobile terminal according to an embodiment of the disclosure.
Figure 44:
FIG. 44 is a schematic diagram of the full screen display page of the mobile terminal according to an embodiment of the disclosure.

Take the initial positions associated with pages in the arrangement diagram of pages of the first application shown in FIG. 41 as an example. FIG. 42 is a schematic diagram of the mobile terminal moving 20 mm in a leftward direction parallel to the screen 21 of the mobile terminal. According to the first direction which is left, the first displacement which is 20 mm, and the initial positions associated with pages, it is determined that the first application page B is a page to be displayed corresponding to the mobile terminal screen 21, and the page B is located in the preset area 211. In this example, the preset direction is the back orientation of the screen 21 of the mobile terminal. Thereafter, the mobile terminal moves toward the back of the mobile terminal screen 21, and as the moving distance gradually increases, the page B corresponding to the mobile terminal screen 21 gradually enlarges. As shown in FIG. 43, it is a schematic diagram of the magnification effect of the page to be displayed when the mobile terminal moves along the back of the mobile terminal screen 21. As shown in FIG. 44, when the second displacement exceeds the predetermined first threshold, the mobile terminal determines that the page to be displayed needs to be displayed, so the real content of page B is displayed in full screen, that is, the WeChat chat page.

S605: acquiring a third direction and a third displacement of the mobile terminal when the mobile terminal moves in the third direction for the third displacement.

The second direction in which the mobile terminal moves is the direction in which the mobile terminal moves after acquiring the page to be displayed of the second application corresponding to the mobile terminal screen in S604. The second displacement is the distance that the mobile terminal moves in the second direction after acquiring the page to be displayed of the second application corresponding to the mobile terminal screen in S604.

Similar to the optional acquisition manner of the first direction and the second direction, the third direction of the mobile terminal may be acquired by one or more of an acceleration sensor, a gyro sensor, and a camera sensor. The third direction acquired by using multiple sensors has higher accuracy.

Similar to the optional acquisition method of the first displacement and the second displacement, the mobile terminal may specifically select the acquisition method of the third displacement according to the magnitude of the acceleration acquired by the acceleration sensor when the mobile terminal acquired by the acceleration sensor moves in the third direction. For details, please refer to the description above, and it will not be repeated here.

S606: When it is determined that the third direction is opposite to the first direction and the third displacement is greater than the predetermined second threshold, the screen of the mobile terminal corresponds to the page to be displayed.

The predetermined second threshold is a preset distance limit used to trigger the operation of the mobile terminal screen corresponding to the page to be displayed. In this step, whether the third direction is opposite to the preset direction, and the relationship between the third displacement and the predetermined second threshold value are two decisive factors that determine whether the mobile terminal can return from the displayed page state to the screen corresponding to the displayed page state. Only when the third direction is determined to be opposite to the first direction and the third displacement is greater than the predetermined second threshold, the mobile terminal screen corresponds to the page to be displayed.

In this embodiment, the first direction determined by S604 is unique. As a specific implementation, if the determined first direction is the back orientation of the mobile terminal screen, when the mobile terminal determines that the third direction is the front orientation of the mobile terminal screen, and the third displacement is greater than the predetermined second threshold, the screen of the mobile terminal corresponds to the page to be displayed. As another specific implementation, if the determined first direction is the front orientation of the mobile terminal screen, when the mobile terminal determines that the third direction is the backward orientation of the mobile terminal screen, and the third displacement is greater than the predetermined second threshold, the screen of the mobile terminal corresponds to the page to be displayed.

When the mobile terminal returns from the state of displaying the page to be displayed to the state of the screen corresponding to the page to be displayed, the content displayed on the screen of the mobile terminal changes from the page to be displayed on the full screen to a preset window or a micro window containing the page to be displayed in the central area of the screen. The micro window may be a schematic diagram of the page to be displayed, a representative icon of the page to be displayed, or a historical screenshot of the page to be displayed, etc., or may be a miniature screen of the page to be displayed. It should be noted that the display area of the micro window is always smaller than the full-screen display area of the screen.

The above is the application page display method provided by the embodiment of the present disclosure. The mobile terminal first acquires the second direction and the second displacement of the mobile terminal moving; acquires a page to be displayed corresponding to the screen of the mobile terminal according to the second direction, the second displacement and the initial position associated with each page of the first application; and acquires a first direction and a first displacement of the movement of the mobile terminal, and display the page to be displayed when it is determined that the first direction is the preset direction and the first displacement is greater than the predetermined first threshold. After displaying the page to be displayed, if the movement of the mobile terminal is detected, the third direction and the third displacement of the mobile terminal movement are acquired, and when it is determined that the third direction is the opposite direction of the first direction and the third displacement is greater than the predetermined second threshold, the screen of the mobile terminal corresponds to the status of the page to be displayed. It can be seen that the method enables the mobile terminal to switch from the screen corresponding to the page to be displayed of the first application, to the screen displaying the page to be displayed, and then back to the screen corresponding to the page to be displayed. Further, the mobile terminal can switch from displaying a page of the first application to displaying another page of the first application by repeatedly executing the application page display method provided in this embodiment, to satisfy the user's needs for convenient switching and display of multiple pages of the same application.

In addition, the embodiments of the present disclosure provide another optional implementation manner to achieve the above-mentioned page switching display effect. After displaying the page to be displayed in the above embodiment S604, when the mobile terminal detects that the screen is touched or the preset button on the screen is triggered, the screen of the mobile terminal corresponds to the page to be displayed. To facilitate understanding of this implementation, the following is an example.

The mobile terminal is preset with a button for enabling the mobile terminal to return to the state of screen corresponding to the page to be displayed from the state of the screen displaying the page to be displayed. The button can be set at a position on the mobile terminal that is convenient for the user to touch, for example, near the lock screen key of the mobile terminal, on the screen of the mobile terminal, or on the back of the mobile terminal housing. In addition, this function can also share the same button with the existing functions of the mobile terminal. When the mobile terminal detects that the button is triggered, which indicates that the user wants to make the mobile terminal pause or stop browsing the currently displayed page and wants to reselect the page to be displayed on the screen. At this time, the mobile terminal responds to the user's trigger operation, the screen corresponds to the page to be displayed.

It can be understood that, in this embodiment, the mobile terminal may also use other methods to return from the state of displaying the page to be displayed to the state of the corresponding page to be displayed on the screen. For example, in response to a specific gesture of the user, or according to the flip angle of the mobile terminal itself, the above functions are realized. The specific implementation manner of the mobile terminal returning from the state of the screen displaying the page to be displayed to the state of the screen corresponding to the page to be displayed is not limited herein.

For the device embodiments, since it basically corresponds to the method embodiments, the relevant part can be referred to the description of the method embodiments. The device embodiments described above are only schematics, wherein the modules described as separate components may or may not be physically separated, and the components displayed as modules may or may not be physical modules, that is, it may be located in one place, or it may be distributed to multiple network elements. Some or all of the modules may be selected according to actual needs to achieve the purpose of the solution of this embodiment. Those of ordinary skill in the art can understand and implement without paying creative labor.

It should be noted that in this description, relational terms such as first and second etc. are only used to distinguish one entity or operation from another, and do not necessarily require or imply any such actual relationship or order between these entities or operations. Moreover, the term "include", "comprise" or any other variation thereof is intended to cover non-exclusive inclusion, so that a process, method, device or equipment including a series of elements includes not only those elements, but also other elements not explicitly listed, or elements inherent in such process, method, device or equipment. Without further restrictions, the element defined by the sentence "include one . . . " does not exclude other identical elements included in the process, method, device or equipment that includes the element.

The aforementioned contents merely are preferred embodiments of the disclosure without any form of restriction to the disclosure. Although the disclosure is disclosed with preferred embodiments as above, but the disclosure is not restricted thereto. Any modification or substitution within the technical scope disclosed by the disclosure that can easily be associated by a person skilled in the art should be included in the protective scope of the disclosure. Therefore, any simply modification, equivalent alteration or decoration of the embodiments based on the technical essence of the disclosure should be included in the protective scope of the technical scheme of the disclosure.

What is claimed is:

1. An interaction method for operable objects, applied to a mobile terminal, comprising:
    acquiring a moving direction and a moving displacement of the mobile terminal when the mobile terminal moves in the moving direction for the moving displacement;
    determining a current position of the mobile terminal based at least in part on the moving direction and the moving displacement;
    determining a first distance between the current position of the mobile terminal and a preset initial position associated with an operable object, wherein the preset initial position associated with the operable object is located outside a screen display of the mobile terminal;
    determining the operable object as a target operable object in response to determining that the first distance between the current position of the mobile terminal and the preset initial position of the operable object is less than a predetermined threshold; and
    performing a target operation on the target operable object in response to determining that the mobile terminal has not moved within a predetermined period of time.

2. The interaction method of claim 1, further comprises:
    presetting a plurality of respective initial positions associated with a plurality of operable objects, wherein the plurality of respective initial positions associated with the plurality of operable objects are located outside the screen display of the mobile terminal.

3. The interaction method of claim 2,
    wherein the plurality of respective initial positions associated with the plurality of operable objects are arranged on a same surface;
    wherein the plurality of respective initial positions associated with the plurality of operable objects are arranged on different surfaces, wherein the different surfaces are parallel to one another; or
    wherein the plurality of respective initial positions associated with the plurality of operable objects are arranged in a preset stereoscopic space.

4. The interaction method of claim 3, wherein the preset stereoscopic space comprises a hexahedron, the mobile terminal is centered in the hexahedron, and the plurality of respective initial positions associated with the plurality of operable objects are arranged on one or more side faces of the hexahedron.

5. The interaction method of claim 1, further comprising:
detecting a movement of the mobile terminal that moves from the current position;
acquiring a second moving direction and a second moving distance of the mobile terminal in response to detecting the movement of the mobile terminal; and
determining a second distance between the mobile terminal and the target operable object according to the current position of the mobile terminal, the initial position of the target operable object, the second moving direction and the second moving distance.

6. The interaction method of claim 1, further comprising:
determining a target file to be transferred; and
transferring the target file to the target operable object.

7. The interaction method of claim 1, further comprising:
determining that the mobile terminal has not moved within the predetermined period of time by using an acceleration sensor or a gyro sensor comprised in the mobile terminal.

8. The interaction method of claim 1, wherein the acquiring the moving direction of the mobile terminal comprises:
acquiring the moving direction of the mobile terminal through an acceleration sensor arranged on the mobile terminal; or
acquiring the moving direction of the mobile terminal through a gyro sensor arranged on the mobile terminal.

9. The interaction method of claim 1, wherein the acquiring the moving displacement of the mobile terminal comprises:
integrating a moving speed of the mobile terminal acquired through an acceleration sensor and a timer arranged on the mobile terminal.

10. The interaction method of claim 1, wherein the acquiring the moving displacement of the mobile terminal further comprises:
acquiring a video via a camera sensor arranged on the mobile terminal when the mobile terminal moves, wherein the video captures ambient images surrounding the mobile terminal, the video comprises a plurality of frames, and the plurality frames comprise feature points; and
determining the moving displacement of the mobile terminal based at least in part on position changes of the feature points in adjacent frames.

11. The interaction method of claim 1, wherein the moving direction of the mobile terminal are at least one of an upward movement, downward movement, leftward movement, rightward movement, forward movement and backward movement.

12. The interaction method of claim 1, wherein the preset initial position associated with the operable object changes with respect to the mobile terminal according to the moving direction and moving displacement of the mobile terminal.

13. A mobile terminal, comprising at least one memory, at least one processor, and at least one of an acceleration sensor or a gyro sensor, wherein the at least one memory is configured to store a program code, and the at least one processor is configured to call the program code stored in the at least one memory to perform an interaction method for operable objects, comprising:
acquiring a moving direction and a moving displacement of the mobile terminal when the mobile terminal moves in the moving direction for the moving displacement;
determining a current position of the mobile terminal based at least in part on the moving direction and the moving displacement;
determining a first distance between the current position of the mobile terminal and a preset initial position associated with an operable object, wherein the preset initial position associated with the operable object is located outside a screen display of the mobile terminal;
determining the operable object as a target operable object in response to determining that the first distance between the current position of the mobile terminal and the preset initial position of the operable object is less than a predetermined threshold; and
performing a target operation on the target operable object in response to determining that the mobile terminal has not moved within a predetermined period of time.

14. A non-transitory computer-readable storage medium, storing program codes configured to cause a computing device to perform operations comprising:
acquiring a moving direction and a moving displacement of the mobile terminal when the mobile terminal moves in the moving direction for the moving displacement;
determining a current position of the mobile terminal based at least in part on the moving direction and the moving displacement;
determining a first distance between the current position of the mobile terminal and a preset initial position associated with an operable object, wherein the preset initial position associated with the operable object is located outside a screen display of the mobile terminal;
determining the operable object as a target operable object in response to determining that the first distance between the current position of the mobile terminal and the preset initial position of the operable object is less than a predetermined threshold; and
performing a target operation on the target operable object in response to determining that the mobile terminal has not moved within a predetermined period of time.

15. The mobile terminal of claim 13, wherein the interaction method further comprises:
determining a target file to be transferred; and
transferring the target file to the target operable object.

16. The mobile terminal of claim 13, wherein the interaction method further comprises:
determining that the mobile terminal has not moved within the predetermined period of time by using the acceleration sensor or the gyro sensor.

* * * * *